United States Patent
Ayers

(10) Patent No.: US 9,481,824 B2
(45) Date of Patent: Nov. 1, 2016

(54) PROCESS FOR PRODUCING A PROPPANT

(71) Applicant: Rebecca Ayers, Stevens Point, WI (US)

(72) Inventor: Rebecca Ayers, Stevens Point, WI (US)

( * ) Notice: Subject to any disclaimer, the term of this patent is extended or adjusted under 35 U.S.C. 154(b) by 0 days.

(21) Appl. No.: 14/573,763

(22) Filed: Dec. 17, 2014

(65) Prior Publication Data

US 2015/0232740 A1  Aug. 20, 2015

Related U.S. Application Data

(63) Continuation of application No. 13/833,662, filed on Mar. 15, 2013, now abandoned.

(60) Provisional application No. 61/665,987, filed on Jun. 29, 2012, provisional application No. 61/675,794, filed on Jul. 25, 2012, provisional application No. 61/691,173, filed on Aug. 20, 2012.

(51) Int. Cl.
*C09K 8/80* (2006.01)

(52) U.S. Cl.
CPC ........................................ *C09K 8/80* (2013.01)

(58) Field of Classification Search
CPC ........................ C09K 8/80; Y10T 428/2982
USPC .......................................... 507/269; 428/402
See application file for complete search history.

(56) References Cited

U.S. PATENT DOCUMENTS

| | | | |
|---|---|---|---|
| 533,802 A | 2/1895 | Greenwood |
| 627,970 A | 7/1899 | Boguszewski |
| 815,856 A | 3/1906 | Nichter |
| 871,539 A | 5/1906 | Thompson |
| 871,536 A | 11/1907 | Thompson |
| 897,489 A | 9/1908 | Prinz |
| 976,980 A | 11/1910 | Blatch |
| 1,119,662 A | 12/1914 | Sutton |
| 1,151,721 A | 8/1915 | Sahlin |
| 1,225,895 A | 5/1917 | Turney |
| 1,515,776 A | 11/1924 | Krussow |
| 1,542,155 A | 6/1925 | Lyman |
| 1,668,534 A | 5/1928 | Berg |
| 1,738,994 A | 12/1929 | Gredell |
| 1,749,981 A | 3/1930 | Montgomery |
| 1,837,294 A | 12/1931 | Scheid |
| 1,909,704 A | 5/1933 | Morseth |
| 1,959,736 A | 5/1934 | Rademacher |
| 1,981,566 A | 11/1934 | Nigro |
| 1,992,297 A | 2/1935 | Dewald |
| 2,039,690 A | 5/1936 | Trainer |
| 2,068,146 A | 1/1937 | Medcalf |
| 2,140,749 A | 12/1938 | Kaplan |
| 2,155,394 A | 4/1939 | Berg |
| 2,286,607 A | 6/1942 | Dyer |
| 2,396,795 A | 3/1946 | Lea |
| 2,442,446 A | 6/1948 | Wallace |
| 2,675,947 A | 4/1954 | Wynn, Sr. |
| 2,724,498 A | 11/1955 | Beresford |
| 3,239,006 A | 3/1966 | Fast |
| 3,421,618 A | 1/1969 | Burney |
| 3,467,281 A | 9/1969 | Archer |
| 3,497,008 A | 2/1970 | Graham |
| 3,537,525 A | 11/1970 | Sarem |
| 3,672,500 A | 6/1972 | Hayes |
| 3,891,546 A | 6/1975 | Humphreys |
| 3,910,835 A | 10/1975 | Stafford |
| 3,913,788 A | 10/1975 | McCauley |
| 4,032,436 A | 6/1977 | Johnson |
| 4,059,189 A | 11/1977 | John |
| 4,068,758 A | 1/1978 | Abdul-Rahman |
| 4,068,759 A | 1/1978 | Abdul-Rahman |
| 4,099,622 A | 7/1978 | Burger |
| 4,118,309 A | 10/1978 | Myers et al. |
| 4,139,141 A | 2/1979 | Tornegard |
| 4,146,137 A | 3/1979 | Beckham |

(Continued)

FOREIGN PATENT DOCUMENTS

| | | |
|---|---|---|
| CA | 2739580 A1 | 8/2010 |
| EP | 2140749 A1 | 1/2010 |

(Continued)

OTHER PUBLICATIONS

D.G. Larsen and L.J. Smith, New Conductivity Found in Angular Blends of Fracturing Sand, Society of Petroleum Engineers, SPE 13814, Mar. 1985.
Intl. Std. ISO 13503-2, Petroleum & Natural Gas Indus.—Part 2: Meas. of Properties of Proppants Used in Hydraulic Fracturing & Gravel-Packing Operations, ISO 13503-2:2006E.
H & T Sheet Metal Manufacturing Inc., printed pages from website, http://spiralseparators.com.
Profile Industries, printed pages from website, http://www.profile-ind.com.
Horiba, printed pages from website, http://www.horiba.com.
Carbo Ceramics, printed pages from website, http://www.carboceramics.com.
G.W. Beehag, Sand Research Shaping Up, Australian Turfgrass Management, Aug.-Sep. 2000, vol. 2.4.

(Continued)

*Primary Examiner* — Leszek Kiliman
(74) *Attorney, Agent, or Firm* — Boardman & Clark LLP

(57) ABSTRACT

An aggregate processing assembly is provided. The processing assembly includes a separator assembly having a central member extending from a first end to a second end, the central member supporting at least one helical flight provided between the first and second ends, the helical flight having a width provided between a proximal end and a distal end. An assembly housing is provided around a portion of the separator assembly, the assembly housing includes a collection portion for receiving processed feed stock which exits the separator assembly radially away from the central member outward past the distal end, and the collection portion includes a first outlet. A second outlet is coupled to the separator assembly for receiving processed feed stock which exits the separator assembly at the second end of the at least one helical flight. A proppant, an aggregate, a system for processing feed stock to produce a proppant or aggregate, and a method of producing a proppant or aggregate is also provided.

21 Claims, 23 Drawing Sheets

(56) References Cited

U.S. PATENT DOCUMENTS

| | | |
|---|---|---|
| 4,207,987 A | 6/1980 | Beckham |
| 4,208,004 A | 6/1980 | Yago |
| 4,213,852 A | 7/1980 | Etkin |
| 4,387,498 A | 6/1983 | Morhard |
| 4,505,811 A | 3/1985 | Griffiths |
| 4,519,896 A | 5/1985 | Vickery |
| 4,538,735 A | 9/1985 | Boom |
| 4,614,580 A | 9/1986 | Giffard |
| 4,747,943 A | 5/1988 | Giffard |
| 4,795,553 A | 1/1989 | Giffard |
| 4,804,093 A | 2/1989 | Durow |
| 4,922,758 A | 5/1990 | Penny |
| 5,069,346 A | 12/1991 | Nichols |
| 5,080,235 A | 1/1992 | Nichols |
| 5,188,175 A | 2/1993 | Sweet |
| 5,381,864 A | 1/1995 | Nguyen |
| 5,535,892 A | 7/1996 | Moorhead |
| 5,611,833 A | 3/1997 | Brahmbhatt |
| 5,931,309 A | 8/1999 | Andersson |
| 5,979,182 A | 11/1999 | Goto et al. |
| 6,085,912 A | 7/2000 | Hacking, Jr. |
| 6,202,854 B1 | 3/2001 | Krieser et al. |
| 6,551,567 B2 | 4/2003 | Konya et al. |
| 6,551,689 B1 | 4/2003 | Prevost |
| 6,635,840 B1 | 10/2003 | Mailloux |
| 6,725,930 B2 | 4/2004 | Boney |
| 6,753,299 B2 | 6/2004 | Lunghofer |
| 6,796,432 B2 | 9/2004 | Soldwish-Zoole |
| 6,863,128 B2 | 3/2005 | Pandey et al. |
| 7,104,403 B1 | 9/2006 | Stephens et al. |
| 7,229,445 B2 | 6/2007 | Hayeck |
| 7,380,669 B2 | 6/2008 | Hacking, Jr. |
| 7,654,323 B2 * | 2/2010 | Alary ............... C01F 7/027 166/280.2 |
| 7,730,948 B2 | 6/2010 | de Grood |
| 7,790,656 B2 | 9/2010 | Windebank |
| 7,846,878 B2 | 12/2010 | Robb |
| 7,867,613 B2 * | 1/2011 | Smith ............... C04B 35/04 427/212 |
| 7,875,192 B2 | 1/2011 | Eigenmann |
| 7,950,455 B2 | 5/2011 | Kaufman |
| 7,954,548 B2 | 6/2011 | Curimbaba et al. |
| 8,022,019 B2 | 9/2011 | Rush et al. |
| 8,075,997 B2 | 12/2011 | Smith |
| D676,215 S | 2/2013 | DeJong et al. |
| 8,786,015 B2 | 7/2014 | Tamura |
| 2003/0078732 A1 | 4/2003 | Pandey |
| 2003/0180537 A1 | 9/2003 | Meyer |
| 2004/0147388 A1 | 7/2004 | Webber |
| 2006/0243832 A1 | 11/2006 | McMinn |
| 2007/0114029 A1 * | 5/2007 | Kazi ............... C09K 8/80 166/280.2 |
| 2007/0173417 A1 | 7/2007 | Kaufman |
| 2009/0227480 A1 | 9/2009 | Cortes |
| 2010/0071902 A1 * | 3/2010 | Ziegler ............... B02C 19/066 166/280.2 |
| 2010/0193189 A1 | 8/2010 | Pershikova |
| 2011/0290917 A1 | 12/2011 | Ziegler |
| 2013/0014945 A1 | 1/2013 | Fang |
| 2013/0098619 A1 | 4/2013 | Shampine |
| 2013/0299397 A1 | 11/2013 | DeJong et al. |
| 2013/0341255 A1 | 12/2013 | DeJong et al. |

FOREIGN PATENT DOCUMENTS

| | | |
|---|---|---|
| WO | WO 2004/041452 | 5/2004 |
| WO | WO 2010/000266 | 1/2010 |
| WO | WO2011/077183 * | 6/2011 |
| WO | WO 2011/077183 | 6/2011 |
| WO | WO 2011/077183 A1 | 6/2011 |
| WO | WO 2012/015299 | 2/2012 |
| WO | WO 2012/034179 | 3/2012 |
| WO | WO 2012/034180 | 3/2012 |
| WO | WO 2012/072656 | 6/2012 |
| WO | WO 2012/139151 | 10/2012 |
| WO | WO 2014/004849 A2 | 1/2014 |

OTHER PUBLICATIONS

M.J. Vepraskas and D.K. Cassel, Sphericity and Roundness of Sand in Coastal Plain Soils and Relationships with Soil Physical Properties, 1987, 1108-1112(5), vol. /Issue 51.

Universal Well Services, Ceramic vs. Sand, The Philadelphia Inquirer.

E.M. Beunder, Influence of Shape on Particle Behaviour in Recycling Techniques, 2000.

L.M. Klein, J. Henderson and S.D. Abraham, Equipment for Cleaning Seeds, Yearbook of Agriculture 1961, pp. 307-321.

Malvern Instruments, Classification Overview, http://www.malverninstruments.fr/ProcessingEng/processes/classification/overview.htm.

D. Kirk, "Principles of Spiral Gravity Classification," The Shot Peener, Fall 2006, pp. 24-30.

H. Ohya et al., "Improvement in the feeding method to an inclined conveyor designed for the recycling of foundry sand," J Mater Cycles Waste Manag. (2003) 5:49-54.

A.M. Winkelmolen, "The Rollability Apparatus," Sedimentology, Dec. 1969, pp. 291-305, vol. 13, Issue 3-4.

Intl. Std. ISO 13503-5, Petroleum & Natural Gas Indus.—Part 5: Procedures for measuring the long-term conductivity of proppants, ISO 13503-5:2006(E).

C. Murali et al., "A Settler for Continuous Particle Shape Separation," International Journal of Mineral Processing, Nov. 1986, pp. 237-249, vol. 18, Issues 3-4.

M Furuuchi, K Gotoh, Shape Separation of Particles, Powder Technology, Nov. 1992, 1-9, vol. 73, Issue 1.

B. Heumann, Before you design an inertial separator: Measuring your dust's aerodynamic particle size, Powder and Bulk Engineering, Apr. 2002.

M. Mando et al., On the modelling of motion of non-spherical particles in two-phase flow, 6th International Conf. on Multiphase Flow, ICMF 2007, Leipzig, Germany, Jul. 2007.

G.S. Riley, K.M. Killingley, Evaluation of a Particle Shape Classifier, J Phys E: Sci. Instrum., 1975, pp. 587-589.

K Yamamoto, T Okumura, M Sugimoto, The Separation of Irregularly Shaped Fine Particles by a Vibrating Rotating Disk, Advanced Powder Technology, 1998, 81-95, vol. 9, No. 1.

H Ohya, S Endoh, M Yamamoto, H Iwata, Analysis of Particle Motion Regarding Shape Separation Using Inclined Conveyor, Powder Technology, Oct. 1993, 55-59, vol. 77, Issue 1.

S Endoh, Sorting of Particles by Inclined Vibrating Plate I. Analysis of the Motion of Particles on an Inclined Vibrating Plate, Powder Technology, Apr. 1987, 103-109, vol. 5.

G.S. Riley, An Examination of the Separation of Differently Shaped Particles, Powder Technology, Sep. 1969, 315-319.

M. Furuuchi et al, The Influence of humidity on dry separation of granular particles based on geometrical characteristics, Powder Technology, Jul. 20, 2005, vol. 155, pp. 125-133.

S. Aravamudhan et al., Separation Based on Shape Part II: Newton's Separation Efficiency, Powder Technology, Aug. 1984, vol. 39, pp. 93-98.

M. Furuuchi, K. Gotoh, Continuous Shape Separation of Binary Mixture of Granular Particles, Powder Technology, Jan. 1988, pp. 31-37, vol. 54, Issue 1.

K .Viswanathan et al., Separation Based on Shape Part I: Recovery Efficiency of Spherical Particles, Powder Technology, Aug. 1984, vol. 39, Issue 1, pp. 83-91.

G.S. Riley, K.M. Killingley, Evaluation of a Particle Shape Classifier, Journal of Physics E: Sci. Instrum., 1975, pp. 587-589.

M Furuuchi, E Ohno, K Gotoh, Shape Characteristics of Granular Materials Precisely Classified by a Shape Separator, Adanced Powder Technolgy, 1990, pp. 89-100, vol. 1, Issue 2.

K Shinohara et al., Analysis on Shape Separation of Ellipsoidal Particles with Inclined Vibrating Troughs, Particulate Science and Technology, 1986, pp. 161-175, vol. 4, Issue 2.

(56) References Cited

OTHER PUBLICATIONS

G.S. Riley, G.R. Mann, Effects of Particle Shape on Angles of Repose and Bulk Densities of a Granular Solid, Materials Research Bulletin, Feb. 1972, p. 163-169, vol. 7, Issue 2.

S Rassenfoss, Selling New Proppant Demands Focus on the Old Bottom Line, JPT, Oct. 2013, 48-53.

C.F. Mancino, P.J. Landschoot, A McNitt, Methods of Classifying Sand Shape and the Effects of Sand Shape on USGA Specification Rootzone Physical Properties, 1996.

S Rassenfoss, "Bigger, Stronger, Lighter, Ways to Open Paths for Oil Production," JPT, Apr. 2013, 37-46.

I.V. Klumpar, F.N. Currier, T.A. Ring, Air Classifiers, Chemical Engineering, Mar. 3, 1986, pp. 77-92.

W. Pabst, E. Gregorova, Characterization of Particles and Particle Systems, ICT Prague 2007, pp. 28-30.

P Saldungaray, T Palisch, Hydraulic Fracture Optimization in Unconventional Reservoirs, Mar. 2012, vol. 233, No. 3.

Daneshy, Hydraulic Fracturing to Improve Production, The Way Ahead, 2010, pp. 14-17, vol. 6, No. 3.

I. Cavarretta, The Influence of Particle Characteristics on the Engineering Behaviour of Granular Materials, Dept. of Civil & Env. Eng., Imperial College of London, Sep. 2009.

J.R. O'Callaghan Gorial, Separation of Grain From Straw in a Vertical Air Stream, Jrnl. of Agri. Eng. Research, vol. 48, Jan.-Apr. 1991, pp. 111-122.

T. Thompson et al., A Holistic Approach to Particle Drag Prediction, Powder Technology, vol. 67, Issue 1, Jul. 1991, pp. 57-66.

K. Larsen, Investigation of Particle Velocity and Drag With Spherical and Non-Spherical Particles Through a Backward Facing Step, Brigham Young Univ., 2007, 132 pp. 3269336.

M. Furuuchi et al., The influence of humidity on dry separation of granular particles based on geometrical characteristics, Powder Technology, 155 (2005), pp. 125-133.

T. Meloy et al., Sieve Cascadography for Characterizing Particle Shape Mixes of Powders, Particulate Science and Techn., 2:259-270, 1984.

K. Shinohara et al., Analysis on Shape Separation of Ellipsoidal Particles With Inclined Vibrating Troughs, Particulate Science and Techn., 4:161-175, 1986.

B. A. Adewumi et al., Grain Classification Using Aerodynamic Principles, African Crop Science Conf. Proceedings, vol. 8, pp. 1799-1801, 2007.

S. Gursoy et al., Determination of Physical Properties of Some Agricultural Grains, Research Jrnl. of Applied Sci., Eng. and Techn., 2(5):492-498, 2010.

Intl. Std. ISO 13503-2, Petroleum & Natural Gas Indus.—Part 2: Meas. of Properties of Proppants Used in Hydraulic Fracturing & Gravel-Packing Operations, ISO 13503-2:2006(E).

International Search Report and Written Opinion of the International Searching Authority for PCT/US2013/048224 filed Jun. 27, 2013.

* cited by examiner

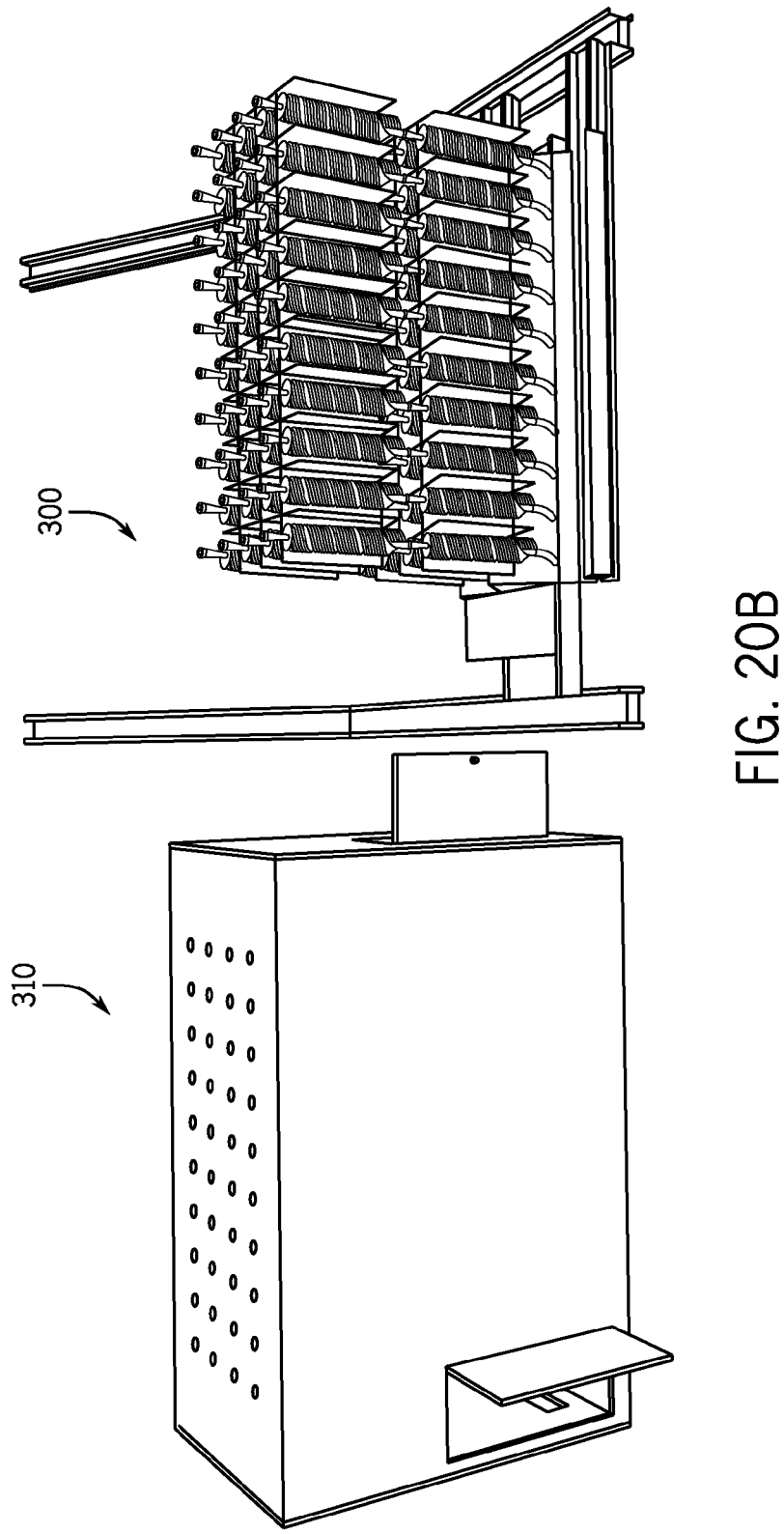

PROCESS FOR PRODUCING A PROPPANT

CROSS REFERENCE TO RELATED APPLICATIONS

This application is a continuation application of U.S. patent application Ser. No. 13/833,662 filed Mar. 15, 2013, which claims priority to U.S. Provisional Application No. 61/665,987 filed Jun. 29, 2012, entitled SEPARATOR, and to U.S. Provisional Application No. 61/675,794, filed Jul. 25, 2012, entitled SPIRAL SEPARATOR, and to U.S. Provisional Application No. 61/691,173, filed Aug. 20, 2012, entitled SPIRAL OR HELICAL SEPARATOR DEVICE, SYSTEM AND A NOVEL METHOD FOR SORTING OR PURIFYING A FRAC SAND OR A PROPPANT, the contents of which are hereby incorporated by reference in their entirety.

FIELD OF THE INVENTION

The present invention relates to aggregate particles. More specifically, the present invention relates to a novel process and system for the processing and production of aggregate particles. The resulting aggregate particles may include proppants usable in the oil or gas industry to prop open subterranean fractures around oil and gas wells, or in a gravel-packing operation, such as for sand control.

BACKGROUND

Aggregates and proppants are generally known in the art. An aggregate is a component of a composite material which provides certain properties to the composite material, including bulk and/or resistance to compressive stress. A proppant, which is a type of an aggregate, is a material used to hold open or "prop" an area in which the proppant is introduced. In the oil or gas industry, a proppant is typically used in association with hydraulic fracturing operations, and in sand control, such as in gravel-pack operations.

During the hydraulic fracturing process, a conductive fracture is induced underground in order to provide a path of extraction for a targeted subterranean material, such as a hydrocarbon, including oil or gas. Typically, a fracturing fluid is introduced into the targeted subterranean area. The fracturing fluid creates hydraulic fractures underground to the targeted subterranean materials. The hydraulic fractures provide a path for the targeted subterranean materials to be extracted, for example through an underground well. In order to keep the induced hydraulic fractures open, to maintain the fracture width, and/or to slow the decline of the fractures, a proppant is typically introduced into the hydraulic fractures. The proppant slows and/or inhibits closure of the fractures when the fracturing fluid is reduced. Accordingly, an appropriate proppant has the ability to flow into the fractures, the ability to form a "pack" or a partial monolayer that provides support and maintains the fractures in an open state, the ability to withstand substantial crushing force in the subterranean area (i.e. crush resistance), and the ability to facilitate flow of a hydrocarbon to an extraction bore or to a well head.

The volume and rate of hydrocarbon production through subterranean fractures or a wellbore can be a function of proppant conductivity. Proppant conductivity is the product of proppant permeability and fracture width. Hydrocarbon production rate can also be influenced by fracture length and the contact area of fractures with reservoir hydrocarbons. For example, an increase in proppant conductivity, fracture length, or fracture contact area with reservoir hydrocarbons can increase the hydrocarbon productivity of a well. Similarly, a decrease in proppant conductivity, fracture length, or fracture contact area with reservoir hydrocarbons can decrease the hydrocarbon productivity of a well.

Due to the necessary requirements of a proppant in hydraulic fracturing, only certain materials are suitable for use as a proppant. For example, some naturally occurring sands, known as "frac sand," meet these requirements. Other materials used as a proppant include, but are not limited to, glass beads, steel shot, nut shells, ceramic pellets, synthetic resin pellets, sintered alumina or bauxite, a polymer, shells, or a mixture of any of these materials.

When designing or selecting a proppant, several proppant properties typically are taken into consideration, as the properties can affect proppant performance to achieve proppant conductivity, fracture length, and ultimately hydrocarbon production. As some of these properties can conflict with each other, the benefit and the cost typically needs to be considered prior to the design or selection of the proppant for a targeted application. In addition, the targeted application can vary depending upon certain factors of a well, including, but not limited to, formation type, formation depth, the treatment to be applied, and/or the equipment to be used.

For example, compressive forces in a fracture can often exceed 1,000 pounds per square inch or psi. A significant fraction of particulates making up a proppant can withstand these compressive forces without crushing or substantially breaking. A frac sand or a lightweight ceramic is often used in applications where compressive forces are less than about 10,000 psi, such as for relatively shallow wells. In deeper wells, where compressive forces can exceed 15,000 psi, higher strength proppants are typically used. These higher strength proppants are often composed of materials having a relatively higher specific gravity than other proppants, such as ceramic or bauxite.

The crushing of a proppant has certain disadvantages, including a reduction in fracture width or close and "pinch off" of a fracture, reducing proppant conductivity. In addition, fines generated from a crushed proppant can clog a proppant pack void space, reducing proppant pack permeability, and thus reducing proppant conductivity. Further, sharp-edged fines may be generated from a crushed proppant. These sharp-edged fines can concentrate the compression force onto an adjacent particle sphere, leading to the crushing of the adjacent particle and subsequent release of additional sharp-edged fines.

While a proppant having a higher specific gravity can improve crush resistance, transportability of the proppant is often compromised, requiring higher viscosity pumping fluids and/or higher pumping rates. In addition, proppants having a higher density generally have higher material costs. This is in addition to additional costs for larger pumping equipment and increased wear rates of fluid carrying equipment.

As another example, the size range of particles making up a proppant is typically relatively narrow and historically controlled through fractionation using sieves. The size range of particles is typically measured in terms of the diameter of the particles. An example of size range distributions of a proppant include, but are not limited to, 6/12, 8/16, 12/18, 12/20, 16/20, 16/30, 20/40, 30/50, 40/60, 40/70, 70/140, and 100 Mesh as according to U.S. sieve pan sizes used to fractionate the proppant. Narrower size range distributions of a proppant are commercially produced, for example for a ceramic proppant. For example, these narrower size range distributions may include 18/20, 20/30, and 30/40. Generally, a narrower size range distribution of a proppant maintained under stress can improve conductivity through increased proppant permeability. However, Median Particle Diameter (MPD) of a proppant can also significantly affect conductivity, as generally the larger the MPD, particularly when maintained under stress or pressure, the greater the conductivity.

A proppant having particles of a smaller MPD can exhibit a higher crush strength and a longer transport distance due to a reduced settling rate. Both of these factors can promote fracture productivity. However, an increase in fracture length and a corresponding increase in accessibility to reservoir hydrocarbons must be weighed against potentially reduced permeability and associated reduced conductivity of the proppant pack formed by these particles. A reduction in permeability and conductivity can reduce fracture productivity.

On the other hand, a proppant having particles of a larger MPD, particularly when maintained under stress, can exhibit relatively high permeability and high conductivity, promoting fracture productivity. However, these particles can settle relatively faster, compromising fracture length and potentially reducing accessibility to hydrocarbons and fracture productivity. Further, these particles can have a reduced crush resistance. Thus, upon crushing can reduce MPD, fracture width, reducing proppant permeability and conductivity.

As another example, the shape of particles in a proppant can profoundly impact its conductivity. Historically, proppants have been sought that have a spherical and rounded shape to maximize load bearing capacity and to even stress distribution, and maximize corresponding crush resistance, permeability, flowability, delivery distance within a fracture, effective fracture width through reduced embedment, and reduced pressure loss, tortuosity, friction against hydrocarbon flow, and abrasion. Together, these shape-dependent properties can serve to increase the effective conductivity of a proppant, and ultimately increase hydrocarbon production rates.

Packing together spheroidal or largely spherical and rounded particles can form capillary-like flow channels through a proppant matrix, leading to reduced tortuosity, and associated reduced pressure loss. This is of particular importance in areas of high flow rates, such as near a well bore or areas of fracture convergence. In these areas, fractures and fluid flow converge and Non-Darcy flow effects can be most pronounced. While spheroidal particles of uniform size offer excellent conductivity, these particles can be prone to flow-back into the well bore. Flow-back of a proppant is undesirable as it can reduce the volume of proppant in the fractures, reducing the productivity through the fractures. Further, proppant flowing back into the well bore and to the surface can abrade well bore components and surface equipment, leading to expensive equipment repair, equipments replacement, and costly downtime. Additional costs can be incurred for the removal and disposal of flow-back proppant from the oil and gas produced from the well bore.

As another example, the surface texture of particles in a proppant can impact proppant performance. A smooth surface texture can offer certain advantages, such as a reduced coefficient of friction. A reduced coefficient of friction can reduce flow friction, resulting in an increase in flow capacity of a fluid through a fracture. Conversely, irregularities on the outside surface of a proppant can lead to uneven stress distribution, proppant crushing, and fine generation. Further, surface irregularities can trap fracturing fluid used during injection, closing up a void space in a proppant pack and reducing proppant permeability and conductivity. This in turn reduces oil or natural gas production. Additionally, a prolonged clean-up of injection fluid can be expensive and cause delays in oil or natural gas production.

Surface irregularities, for example in the form of dents, protrusions, burs, rough surface textures, or angular edges has the additional disadvantage of a high degree of abrasiveness. The presence of an abrasive particle in the well bore during injection or production can damage well and pumping equipment, increasing tool and equipment costs and leading to costly well downtime. However, surface irregularities potentially can reduce proppant flow-back.

In addition, the presence of clusters in a proppant can have adverse affects on the proppant. A cluster is formed of many small granular particles, and has a rough surface texture. Clusters can reduce the strength of the proppant, increase flow friction, and ultimately reduce proppant conductivity. Clusters are often found in frac sand.

The presence of contaminant particles in a proppant can also have adverse affects on the proppant. Contaminant particles are often found in frac sand, and may include feldspar, mica, magnetite, hematite, biotite, milky quartz, iron ore, and/or dolomite. Contaminant particles can reduce proppant strength, increase acid solubility, increase abrasiveness, increase flow friction, and ultimately reduce proppant conductivity.

As another example, additional requirements for a proppant can include chemical inertness towards fracturing fluid crosslinkers and breakers, and acid tolerance.

Progress has been made to optimize functionality of certain synthetic proppants, such as ceramic proppants. For example, a lightweight ceramic proppant can have a relatively low specific gravity, and a high degree of sphericity and roundness. However, production costs of synthetic proppants can be high and further increased when the particle size distribution is narrowed. In addition, synthetic proppants can be highly abrasive and can incur additional costs related to equipment damage, tooling damage, and well downtime when used.

Frac sand, while relatively inexpensive, typically includes a heterogeneous mixture of particle shapes, which include irregularly shaped particles and highly spherical and rounded particles. Further, frac sand typically includes a heterogeneous mixture of particle surface textures, and may also include clusters and/or contaminants. Where some particles of frac sand have a smooth surface texture, other particles have a rough surface texture. Irregular or angular shaped frac sand particles, or particles having a rough surface texture can have a detrimental impact on conductivity, and ultimately can reduce the rate of hydrocarbon production. In addition, the abrasiveness of these frac sand particles incurs additional costs related to equipment damage, tooling damage, and well downtime when used.

Similar to frac sand, resin-coated frac sand or resin-coated sand includes a relatively heterogeneous mixture of particle shapes, including irregularly shaped particles and highly spherical and rounded particles. While a resin coating can slightly improve sphericity or roundness of a frac sand particle, significant irregularities in shape within the particle population remain. Resin-coated sand can be used near the well bore, a zone of high fluid velocity and turbulence, in order to reduce proppant flow-back into the well. A resin-coating can also reduce fine generations, and maintain a high structural integrity of proppant by improved crush resistance. This together acts to optimize conductivity and hydrocarbon flow through the well bore. However, resin chipping can lead to clogged void space, reduced permeability, and reduced strength of the resin-coated sand. In addition, resin-coated sand requires a costly special treatment which can be negatively affected by temperature.

Currently, no processing system exists that through direct modification can increase sphericity and roundness of frac sand to produce a generally highly spherical and rounded frac sand without also introducing surface irregularities or pre-stress particles of the frac sand. For example, while a sand reclamation system can be used to rub together frac sand particles in order to increase the sphericity and roundness of the particles, in doing so, dents and/or protractions can result on the surface of the particles. In another example of a system, a frac sand particle is repeatedly shot at high velocity against a metal plate to achieve a spherical and rounded particle shape. However, this process can lead to pre-stressing or fracturing of the particle, reducing crush resistance of the particle. In addition, in both system examples, significant waste is incurred during shape modification to the frac sand particles.

In addition, no processing system exists that can remove abrasive particles from a frac sand to produce an abrasion-resistant frac sand. An attrition scrubber can be used to remove a surface irregularity from a frac sand particle, reducing the roughness of surface texture and associated abrasiveness of the frac sand particle. However, an attrition scrubber is unable to significantly remove or affect relatively more angular, un-spherical, or irregularly shaped particles or clusters, or particles having a rough surface texture. These abrasive particles remain in the frac sand processed by an attrition scrubber.

Due to the disadvantages of irregularly shaped, rough surface texture sand, there is a need for a sand that is of highly spherical and rounded shape, is smooth of surface texture, yet retains the benefits of a low specific gravity. Further, a sand size gradation or MPD is currently not necessarily optimized for one or more proppant properties. There is a need for the ability to further modify a sand size gradation or MPD to result in optimal performance or economics of a proppant. In addition, there is a need for a more abrasion-resistant proppant that is less abrasive than a typical frac sand or a synthetic proppant, such as a ceramic proppant.

Furthermore, there is a need for a sand that exhibits greater permeability and conductivity, particularly for use near or adjacent to the well bore. This sand can be resin-coated, such as to further reduce flow-back, reduce fine generation, or to increase the strength of the sand. Furthermore, there is a need for a sand that would be an alternative to resin-coated sand, as the sand would not require resin-coating of particles, but that similarly reduces proppant flow-back.

In addition, due to the limited number of naturally-occurring aggregate particle deposits for certain uses, there is a need for a system of processing aggregate particles to acquire particles having certain desired properties. For example, there are a limited number of naturally-occurring aggregate particle deposits, such as sand, suitable for use as a proppant. As another example, there are a limited number of naturally-occurring aggregate particle deposits, such as sand, suitable for use in other industries, including, but not limited to, sand blasting, molding, shot peening, concrete, masonry, landscaping, agriculture, artificial turf, electronics, or filtration.

In addition, shipping of an aggregate particle can be expensive, and can economically limit access to certain aggregate particles. More specifically, while an aggregate particle of a distant deposit may have one or more beneficial properties, it can be cost prohibitive to ship compared to a local deposit. Accordingly, there is a need for a system of processing aggregate particles which may be movable.

SUMMARY OF THE DESCRIPTION

The present invention provides an improved system for processing and producing a hydraulic fracturing proppant or a proppant for use in sand control methods, such as in a gravel-pack. The present invention provides a system for processing relatively inexpensive materials, such as sand and/or silica sand, to produce a proppant having the desired and suitable properties to serve as an effective hydraulic fracturing proppant. In addition, the present invention provides a system which can be mobile. Further, the present invention provides for the production of a value added proppant suitable to serve as an effective hydraulic fracturing proppant or for use in sand control.

A proppant is provided. The proppant results from a separator means and comprises a plurality of particles. The particles have an average Krumbein and Sloss Sphericity Value of 0.6 or above, and an average Krumbein and Sloss Roundness Value of 0.6 or above.

A proppant resulting from a separator means which separates a feed stock is also provided. The proppant comprises a plurality of particles, the particles have an average Krumbein and Sloss Sphericity Value of at least 0.01 greater than the average Krumbein and Sloss Sphericity Value of the feed stock. The proppant includes a plurality of particles, the particles have an average Krumbein and Sloss Roundness Value of at least 0.01 greater than the average Krumbein and Sloss Sphericity Value of the feed stock. In addition, a proppant is provided that can include a larger or smaller MPD or a modified size distribution profile compared to the feedstock through use of the separator means or screening apparatus.

An aggregate resulting from a processing means which separates a feed stock is also provided. The aggregate includes a plurality of particles, the particles have an average median particle diameter of at least 1 micron more than the average median particle diameter of the feed stock.

A proppant processing assembly is also provided. The processing assembly includes a separator assembly having a central member extending from a first end to a second end, the central member supporting at least one helical flight provided between the first and second ends, the helical flight having a width provided between a proximal end and a distal end. An assembly housing is provided around a portion of the separator assembly, the assembly housing includes a collection portion for receiving processed feed stock which exits the separator assembly radially away from the central member outward past the distal end, and the collection portion includes a first outlet. A second outlet is coupled to the separator assembly for receiving a second fraction of processed feed stock which exits the separator assembly at the second end of the at least one helical flight.

A recombinant aggregate is also provided. The recombinant aggregate includes a first aggregate fraction resulting from a processing means, the first aggregate having a first particle size profile, a second aggregate fraction resulting from a processing means, the second aggregate having a second particle size profile, wherein the first and second aggregate fractions are combined at a ratio such that the resulting mixture has a third particle size profile different from the first particle size profile and second particle size profile.

A recombinant aggregate is also provided. The recombinant aggregate includes a first aggregate fraction resulting from a processing means, the first aggregate having a first particle shape profile, a second aggregate fraction resulting from a processing means, the second aggregate having a second particle shape profile, wherein the first and second aggregate fractions are combined at a ratio such that the resulting mixture has a third particle shape profile different from the first particle shape profile and second particle shape profile.

BRIEF DESCRIPTION OF THE DRAWINGS

FIG. 20B is an isometric view of one or more examples of embodiments of a processing system implementing a plurality of processing systems in series, each having at least one processing assembly of FIG. 1

DETAILED DESCRIPTION

The invention illustrated in the Figures and disclosed herein is generally directed to a processing assembly 100 for the production of a proppant or an aggregate, a system of the production of a proppant or an aggregate, a method of producing a proppant or an aggregate, and an associated proppant or aggregate. More specifically, the processing assembly, system, method, and associated proppant have certain properties suitable for use as a proppant in hydraulic fracturing, sand control, and/or gravel-pack operations. It should be appreciated that the feed stock may be unprocessed or processed, and may be a proppant or an aggregate. Further, the feed stock may be treated or coated, for example resin coated. The feed stock may also be dry or relatively dry prior to processing. In addition, any of the processed fractions may be suitable as an aggregate or a proppant. In addition, any of the processed fractions may be suitable as an aggregate or a proppant alone, or in combination with one or more separate fractions or one or more feed stocks. It should be appreciated that the Figures provided herein are for illustration and are not necessarily to scale.

It should be appreciated that the disclosure provided herein may reference roundness and/or sphericity. Roundness is the measure of the sharpness of a particle's edges and corners. The more rounded or less sharp the edges and corners, the higher the particle roundness. Sphericity is the measure of how spherical a particle is, typically in comparison to a perfect sphere. The more spherical shape of the particle, the higher the particle sphericity. Both roundness and sphericity may be respectfully graded on a scale from 0.0 to 1.0, with 1.0 being either perfectly round or perfectly spherical. Roundness and/or sphericity may be graded using the Krumbein and Sloss Table, which is a visual comparison chart for particle roundness and particle sphericity developed by William C. Krumbein and Laurence L. Sloss. The Krumbein and Sloss Table describes particle roundness and particle sphericity for a range of particle shapes, using values ranging from 0.1 to 0.9. A particle having a Krumbein and Sloss Roundness Value of 0.1 is less round, while a particle having a Krumbein and Sloss Roundness Value of 0.9 is more round. Similarly, a particle having a Krumbein and Sloss Sphericity Value of 0.1 is less spherical, while a particle having a Krumbein and Sloss Sphericity Value of 0.9 is more spherical. Hereinafter, the Krumbein and Sloss Roundness or Krumbein and Sloss Sphericity values may respectively be referenced as a "K&S" Roundness or "K&S" Sphericity value.

Figure 1:
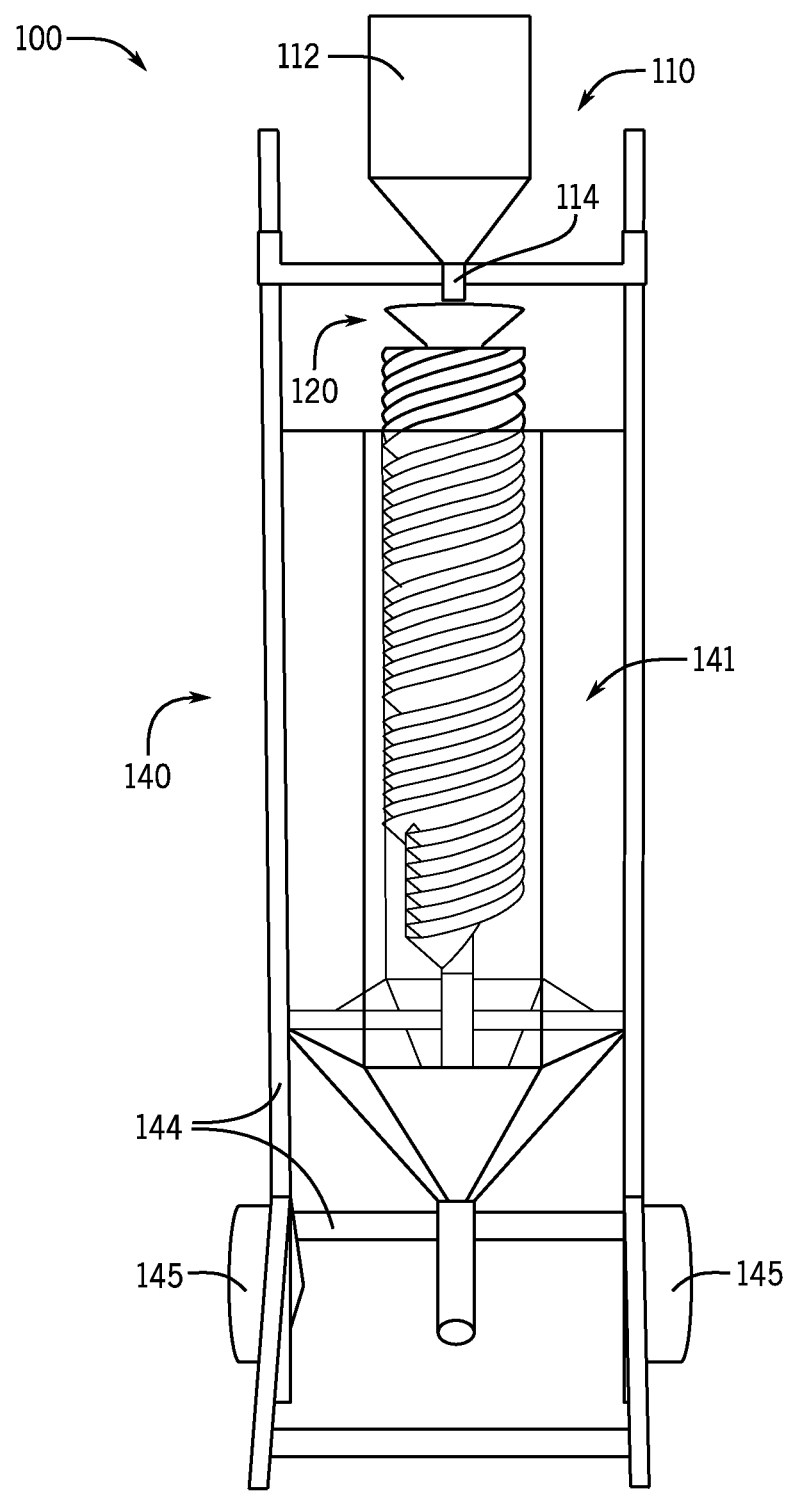
FIG. 1 is an isometric view of one or more examples of embodiments of a processing assembly for the production of a proppant.
Figure 2:
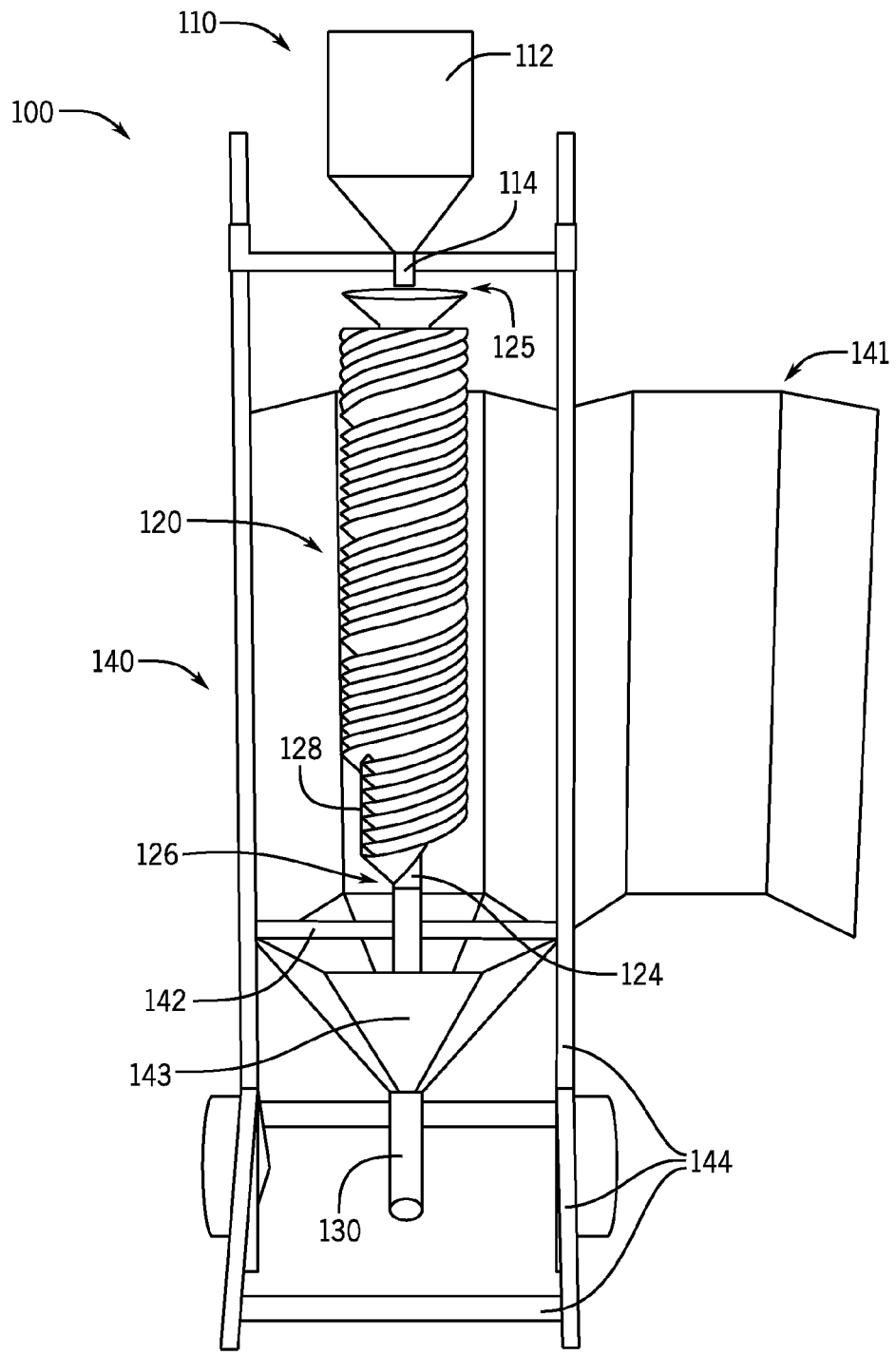
FIG. 2 is front elevation view of the processing assembly of FIG. 1, illustrating the front side of the processing assembly and the containment shield in an open position.
Figure 3:
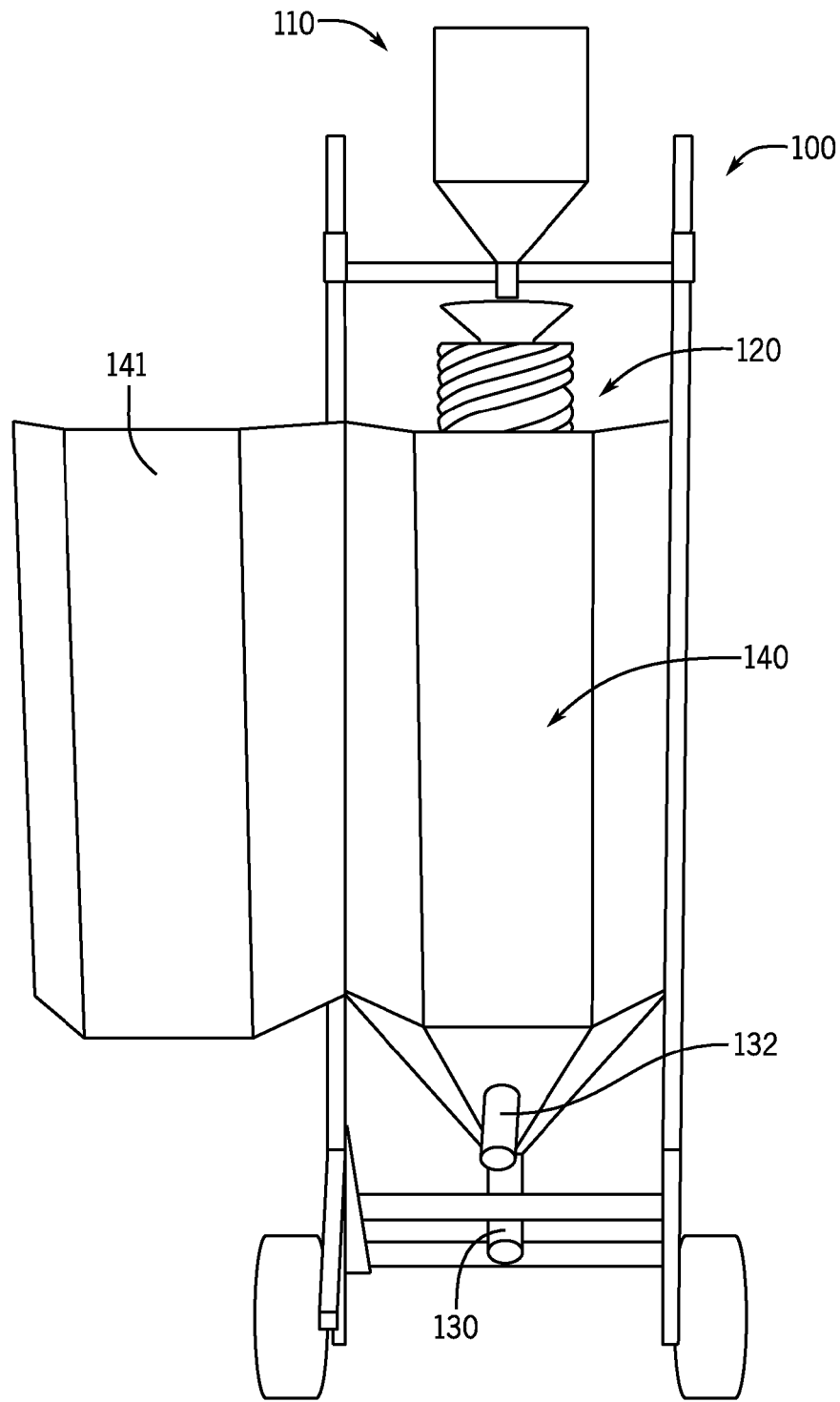
FIG. 3 is a rear elevation view of the processing assembly of FIG. 1, illustrating the back side of the processing assembly and the containment shield in an open position.

Referring now to the Figures, FIGS. 1-3 illustrate one or more examples of embodiments of a processing assembly 100 for the processing and/or production of an aggregate or a proppant. Assembly 100 may include a raw stock distribution assembly or feed stock delivery assembly 110. Feed stock delivery assembly 110 is in operable communication with a separator assembly or feed stock sorting assembly or spiral separation assembly 120. Separator assembly 120 may be in operable communication with a first processed feed stock discharge, such as first outlet 130, and a second processed feed stock discharge, such as second outlet 132. In one or more examples of embodiments, separator assembly 120 may include more than two outlets for the selective removal of processed feedstock or fractions thereof.

Feed stock delivery assembly 110 may include a supply chest or headbox or stuffbox or feed stock supply chamber 112. Supply chest 112 may be provided to maintain an amount of feed stock to processing assembly 100. Supply chest 112 may further act as a retention tank in order for processing assembly 100 to operate as a batch process. In the alternative, processing assembly 100 may operate as a continuous process. As a continuous process, feed stock may be provided to supply chest 112 through any suitable or desired assembly, for example a supply line, pipe, tube, shaker, conveyor or other suitable supply assembly. In one or more alternative examples of embodiments, processing assembly 100 may continuously operate without a supply chest 112, instead having a suitable supply assembly providing feed stock to separator assembly 120.

A feed stock supply line 114 may be operably connected to supply chest 112. Supply line 114 preferably transfers feed stock from supply chest 112, to separator assembly 120. Supply line 114 may include a feed stock flow control (not illustrated). Flow control may be a valve for increasing or decreasing feed stock flow through supply line 114 to separator assembly 120. Flow control may be a manual hand valve or may be an automated valve adapted to actuate by command, for example an electronic command.

Figure 4:
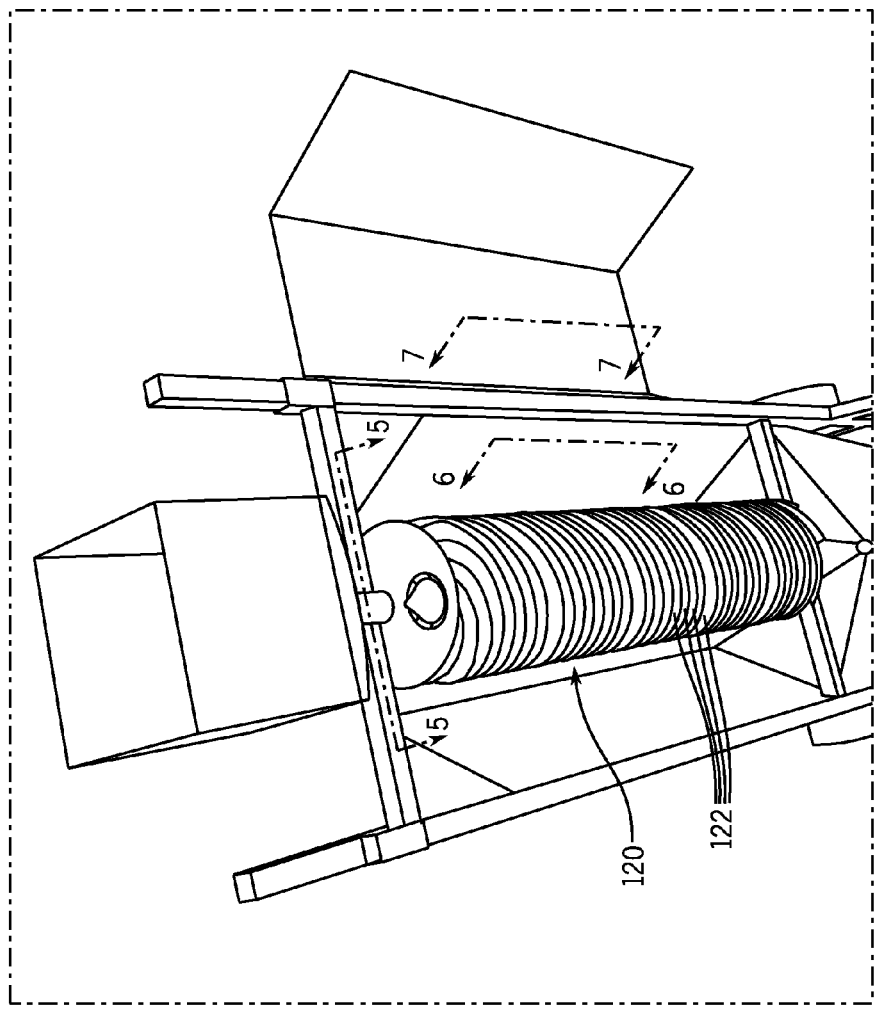
FIG. 4 is an isometric view of a portion of the processing assembly of FIG. 1, illustrating the separator assembly of the processing assembly and the containment shield in an open position.

Referring now to FIGS. 1-2, separator assembly 120 may be in operable communication with feed stock supply line 114. More specifically, feed stock may pass from feed stock supply line 114 to separator assembly 120. As illustrated in the figures, separator assembly 120 is a spiral or helical or helical-like separator for the processing of feed stock. Separator assembly 120 may include a plurality of flights 122 (as shown in FIG. 4). Each of the plurality of flights 122 may be provided about a central member or core member 124. Generally, each of the plurality of flights 122 is provided in a helical or helical-like orientation about core member 124. Each of the plurality of flights 122 may extend from an entry end or first end 125 of separator assembly 120 to an exit end or second end 126 of separator assembly 120. As illustrated, each of the plurality of flights 122 makes approximately four revolutions about core member 124. It should be appreciated in one or more examples of embodiments that each of the plurality of flights 122 may make fewer than approximately four revolutions about core member 124, or may make more than approximately four revolutions about core member 124. It should be appreciated in one or more examples of embodiments that separator assembly 120, one or more of the plurality of flights 122, or a portion thereof may be made of, formed of, composed of, coated with, and/or be treated with an abrasion resistant material.

Figure 5:
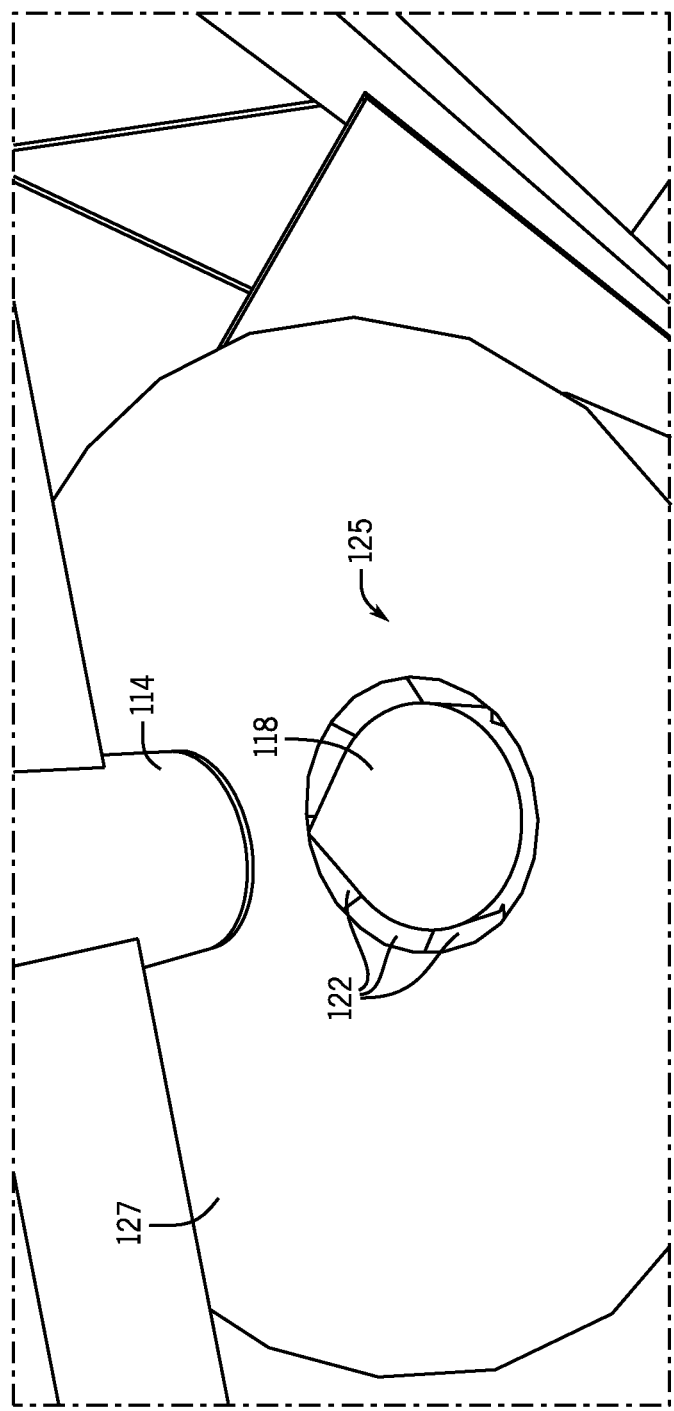
FIG. 5 is a close up view of a portion of the processing assembly of FIG. 1, taken along line 5-5 of FIG. 4.
Figure 6:
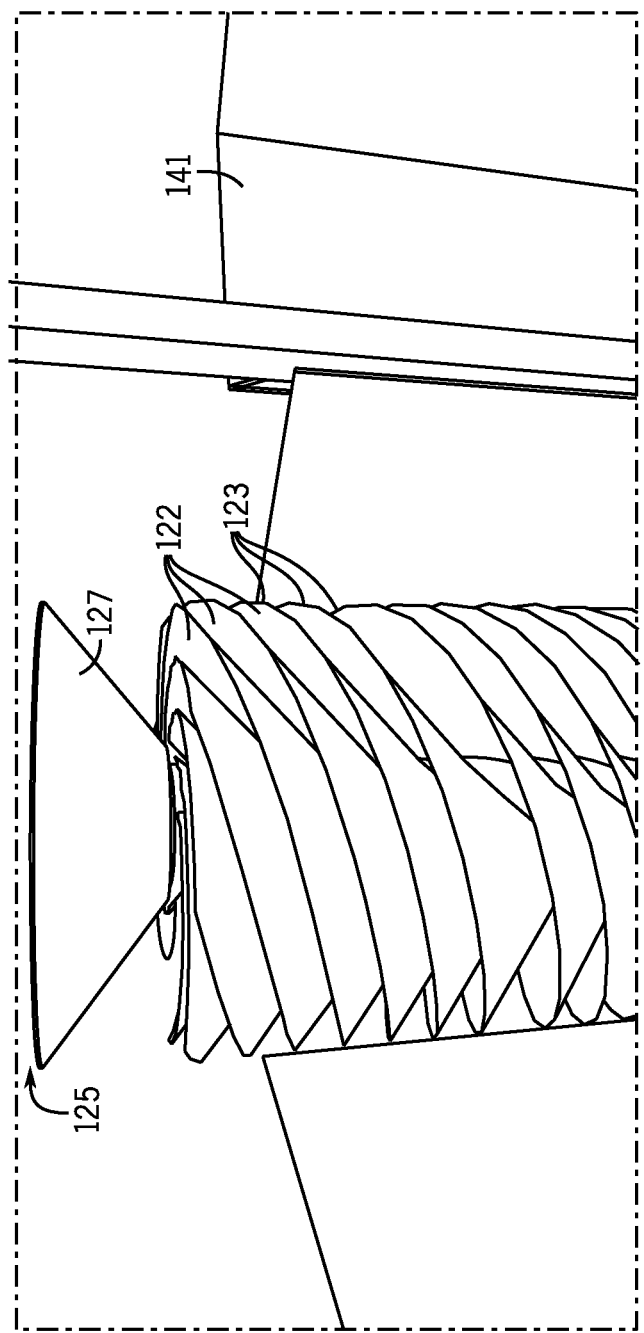
FIG. 6 is a close up view of a portion of the processing assembly of FIG. 1, taken along line 6-6 of FIG. 4.
Figure 7:
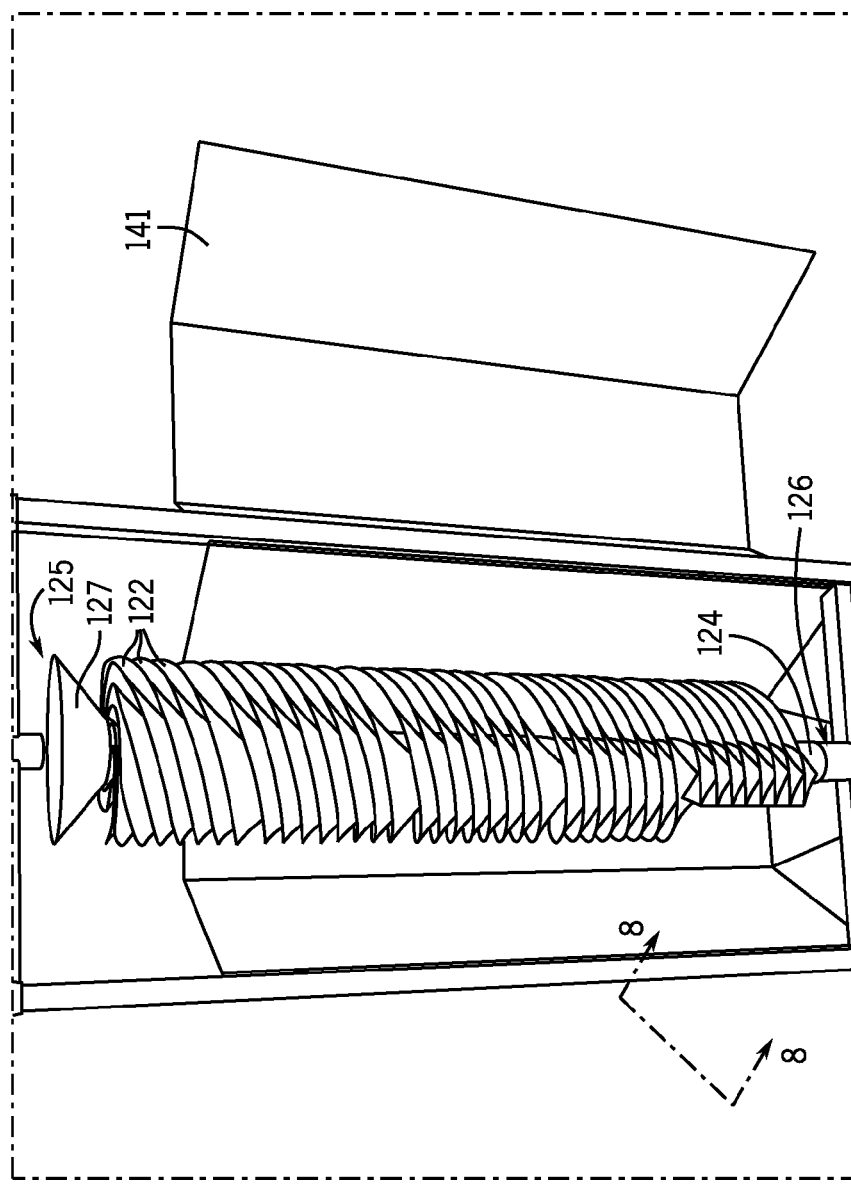
FIG. 7 is a close up view of a portion of the processing assembly of FIG. 1, taken along line 7-7 of FIG. 4.

FIGS. 5 and 6 provide a close up view of entry end 125 of separator assembly 120. Entry end 125 may include central member 124. The plurality of flights 122 helically extend from central member 124. As illustrated in FIG. 7, the plurality of flights 122 are helically nested or intertwined. The nested plurality of flights 122 provides additional surface area to process a larger volume of feed stock than a single helical flight. As shown, eight flights 122a-122h helically extend about central member 124. The flights 122a-h (shown in FIG. 8) originate from an entry end 125 of central member 124. It should be appreciated in one or more examples of embodiments of separator assembly 120 that more than eight flights 122 or fewer than eight flights 122 may helically extend about central member 124.

Figure 11:
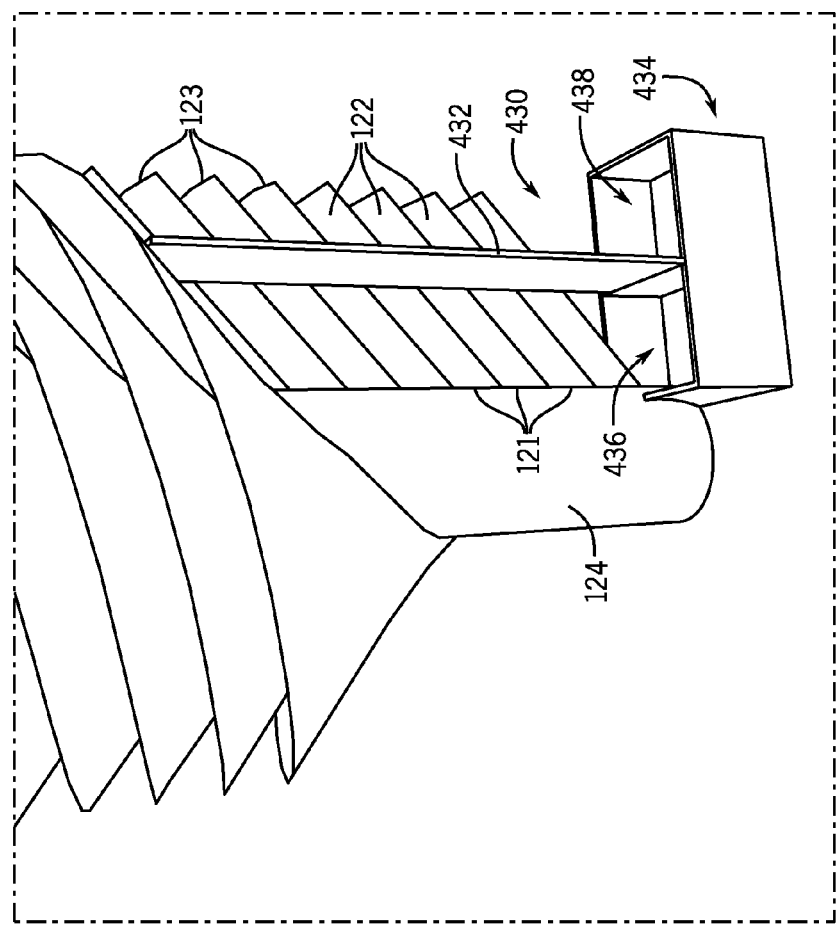
FIG. 11 is a close up view of one or more examples of embodiments of a portion of the processing assembly of FIG. 1, illustrating a splitter provided in line with a plurality of flights.

As illustrated in FIG. 11, each of flights 122 has a proximal end 121 and a distal end 123. Proximal end 121 of each flight 122 is provided closest to central member 124, while distal end 123 is provided away from central member 124 opposite proximal end 121. Each of flights 122 may be at least perpendicular to central member 124. Preferably, each of flights 122 form an acute angle or angle of less than ninety degrees which extends between central member 124 and each connected flight 122. It should be appreciated in one or more examples of embodiments that one or more flights 122, or one or more portions of flights 122 may have a variable angle between central member 124 and the flight 122 across the flight 122 from proximal end 121 to distal end 123. Stated otherwise, one or more flights 122, or one or more portions of flights 122 may be approximately arcuate from proximal end 121 to distal end 123. In addition, the length of each flight 122 as measured from proximal end 121 to distal end 123 may be between one inch and two hundred and forty inches, more specifically may be between about two inches and twenty four inches, and more specifically may be between about three inches and six inches. However, in one or more examples of embodiments, the length of each flight 122 as measured from proximal end 121 to distal end 123 may be any desired or targeted length based upon various factors, including, but not limited to, the type of unprocessed feed stock, the processing volume, the feed stock flow rate, the flight angle, the targeted properties of the portion of the feed stock processed by separator assembly 120, and/or the yield of the portion of the feed stock processed by separator assembly 120. Generally, each of flights 122 is accessible or open at distal end 123. In one or more examples of embodiments, a portion of each of flights 122 may be accessible or open at distal end 123 to allow for a certain portion of feed stock to exit the associated flights 122.

Referring to FIG. 5, a funnel or entry shield 127 may be provided around central member 124. In addition funnel 127 may be provided around a portion of flights 122. Funnel 127 may assist in directing feed stock from supply line 114 into separator assembly 120 through entry end 125.

Referring to FIG. 5, supply line 114 may include a dispersal member or disperser 118. In one or more examples of embodiments, dispersal member 118 may be coupled to supply line 114 by one or more attachment members (not shown). Dispersal member 118 may be a conical member 118 adapted to disperse or spread out or distribute feed stock from supply line 114 prior to entering separator assembly 120. It should be appreciated in one or more examples of embodiments that dispersal member 118 may be any shape or size suitable to disperse or distribute feed stock from supply line 114 prior to entering separator assembly 120.

Figure 8:
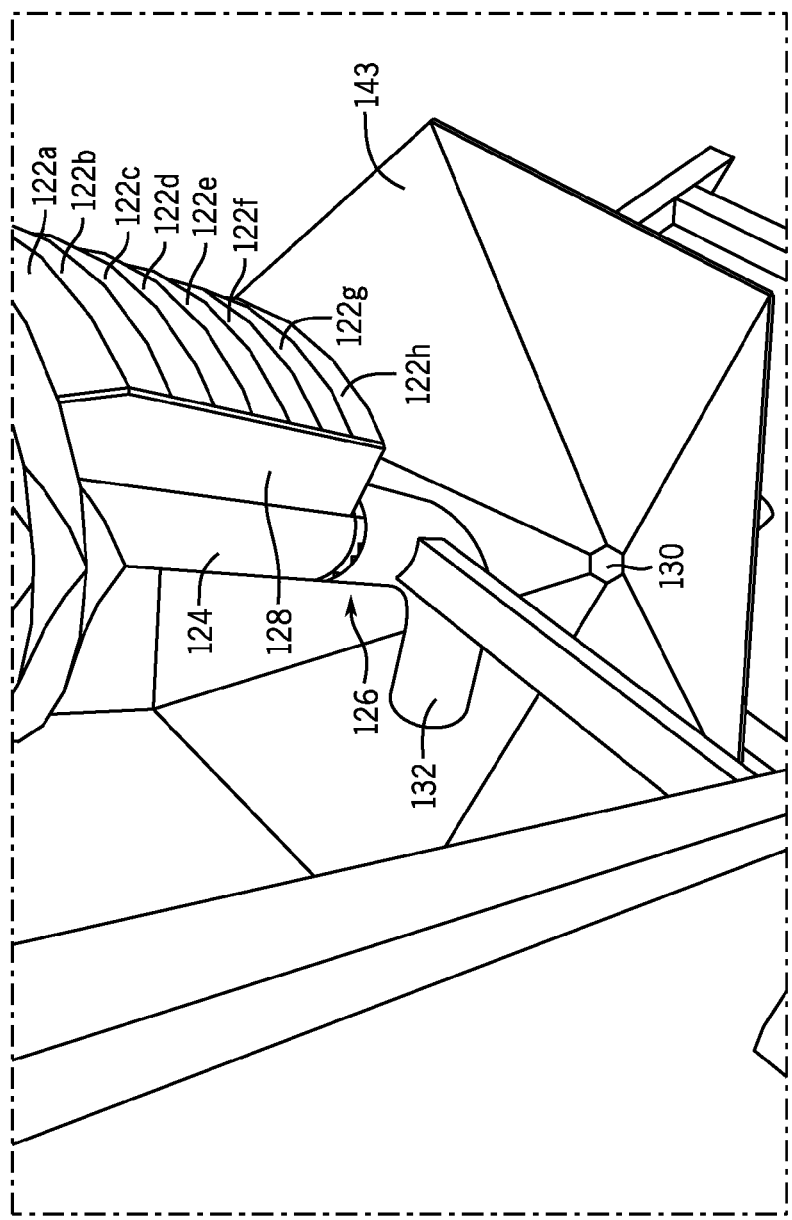
FIG. 8 is a close up view of a portion of the processing assembly of FIG. 1, taken along line 8-8 of FIG. 7.

Referring to FIG. 7, the plurality of flights 122 helically extend about central member 124 from entry end 125 to exit end 126. As illustrated in FIG. 8, a termination member 128 may be provided at the desired termination point of the plurality of flights 122. Termination member 128 may extend from the distal end 123 of each of the plurality of flights 122 toward the proximal end 121 of each of the plurality of flights 122. Termination member 128 is adapted to direct a portion of feed stock to a second outlet 132. Second outlet 132 may be coupled to a portion of central member 124. For example, as illustrated, central member 124 is substantially hollow. Accordingly, termination member 128 directs a portion of feed stock into one or more apertures (not shown) provided in central member 124 at the second end 126. Second outlet 132 is accordingly coupled to central member 124 at the second end 126, such that a portion of feed stock directed by termination member 128 exits separator assembly 120 through second outlet 132. In one or more examples of embodiments, termination member 128 may be provided along a portion of the plurality of flights 122 to direction a portion of processed feed stock to an outlet, such as the second outlet 132. In addition, termination member 128 may be movable radially between the proximal and distal ends 121, 123. Further, termination member 128 may be extendable radially to provide different sizes of termination member 128 between the proximal and distal ends 121, 123.

Referring back to FIGS. 1-3, separator assembly 120 may be provided in an assembly housing 140. Assembly housing 140 may be provided around the perimeter of separator assembly 120 and substantially encase separator assembly 120. Assembly housing 140 may include an access panel 141 to allow access to separator assembly 120. As shown in FIGS. 1 and 2, access panel 141 may be pivotally connected to a portion of assembly housing 140 to enable selective access to separator assembly 120. In addition, a portion of access panel 141 may include one or more transparent panels to enable observation of operation of separator assembly 120.

Separator assembly 120 may be mounted on or supported by a support member 142. Support member 142 may be connected to or integrally formed with assembly housing 140. Support member 142 may be any suitable member able to structurally support separator assembly 120 during operation of separator assembly 120 in accordance with the present disclosure.

Assembly housing 140 may also include a collection portion 143. As shown in FIG. 8, collection portion 143 may be provided toward the exit end 126 of separator assembly 120. Collection portion 143 may be a conical or frustoconical portion which extends to a first outlet 130. For example, collection portion 143 may have a maximum inner diameter which is equal to a maximum inner diameter of assembly housing 140. The inner diameter of collection portion 143 subsequently will decrease from assembly housing 140 toward first outlet 130. This is to facilitate or channel a portion of processed feed stock through first outlet 130 and out of assembly 100. In one or more examples of embodiments, collection portion 143 may be any suitable size or shape to facilitate collection of a portion of the processed feed stock from separator assembly 120. In addition, in one or more examples of embodiments, collection portion 143 may have a maximum inner diameter which is greater than a maximum inner diameter of assembly housing 140.

Referring to FIGS. 1 and 2, assembly 100 may also include a plurality of frame members 144. Frame members 144 may be provided to support housing 140 and the associated separator assembly 120. Frame members 144 may be of any suitable size, shape, and/or strength suitable to support operation of separator assembly 120 and/or to prevent settling or buildup of particles atop frame member 144 in accordance with the disclosure provided herein. In addition, a plurality of wheels 145 may be coupled to frame members 144. Wheels 145 may allow assembly 100 to be mobile or moved to a desired location.

It should be appreciated in one or more examples of embodiments of assembly 100, a plurality of separator assemblies 120 may be provided in an assembly housing 140. The plurality of separator assemblies 120 may share a common collection portion 143. In addition, the plurality of separator assemblies 120 may each have an outlet to a second outlet 132, or may each connect to a single, common second outlet 132.

In operation and use of assembly 100, a feed stock is introduced to assembly 100. For example, the feed stock may be naturally occurring sand, including, but not limited to silica sand. Further, the feed stock may be a specific sand or a commonly found sand. The feed stock likely will have a broad range of particle properties, including, but not limited to, a relatively broad roundness and/or sphericity profile. Stated otherwise, the feed stock likely will have particles having a range of roundness and/or sphericity. For example, the feed stock may have an average Krumbein and Sloss Roundness Value of 0.1 to 0.9, more specifically of 0.3 to 0.9, and more specifically of 0.5 to 0.9. In addition, the feed stock may have an average Krumbein and Sloss Sphericity Value of 0.1 to 0.9, more specifically of 0.3 to 0.9, and more specifically of 0.5 to 0.9. Assembly 100 will process the feed stock to separate the substantially round and substantially spherical feed stock particles from the remaining feed stock particles, or remove substantially angular or irregular particles. This process will result in a portion of the feed stock being preferable for use as a proppant, and further as a proppant for use in hydraulic fracturing, or sand control, such as a gravel packing operation.

It should be appreciated that prior to introduction to assembly 100, feed stock may be prescreened before introduction to the feed stock delivery assembly 110. For example, in one or more examples of embodiments, feed stock may be prescreened to capture a size fraction or grade of the feed stock. A suitable size fraction or grade may be 20/40. However, it should be appreciated that a suitable size fraction or grade may include, but is not limited to, 6/12, 8/16, 12/18, 12/20, 16/20, 20/40, 16/30, 30/50, 40/60, 40/70, 70/140, 100 mesh, and/or any other suitable or desired size fraction or grade. The fraction or grade is generally determined by the maximum screen size through which a percentage of particles pass and the minimum screen size through which a percentage of the particles do not pass. Typically, the smaller the number, the larger the screen sieve opening size, while the larger the number, the smaller the screen sieve opening size. Consequently, the size fraction or grade is generally defined by the maximum screen size and the minimum screen size. It should also be appreciated that one or more fractions of feed stock processed by assembly 100 and/or separator 120 may be screened based upon size to modify the size distribution profile of one or more fractions.

Once introduced into the feed stock delivery assembly 110, the prescreened feed stock or feed stock may be metered or fed or transferred to separator assembly 120. For example, the feed stock may travel through supply line 114 to entry end 125 of separator assembly 120. In addition, the feed stock may be dispersed or spread out by contacting dispersal member 118 after exiting supply line 114 and entering separator assembly 120 at entry end 125. Dispersal member 118 may distribute the feed stock across entry end 125 of separator assembly 120.

The feed stock will be distributed upon one of the plurality of flights 122. The feed stock will then travel along each associated flight 122, moving helically around central member 124. As the feed stock travels along each associated flight 122, feed stock which is of a greater roundness and/or a greater sphericity will generally travel towards the distal end 123 of each associated flight 122. Feed stock which is of lower roundness and/or a lower sphericity will generally remain on each associated flight 122. For example, feed stock which is of lower roundness and/or a lower sphericity may generally remain closer in proximity to the proximal end 121 than the distal end 123 of each associated flight 122.

As the feed stock continues to helically travel along each associated flight 122, the portion of the feed stock having a greater roundness and/or a greater sphericity will generally eventually exit the plurality of flights 122 radially. Stated otherwise, the portion of the feed stock having a greater roundness and/or a greater sphericity will generally travel beyond distal end 123 and exit separator assembly 120. The portion of the feed stock having a lower roundness and/or a lower sphericity and which generally does not exit the plurality of flights 122 radially will remain in contact with each associated flight 122 until reaching termination member 128.

The portion of the feed stock generally having a greater roundness and/or a greater sphericity and which radially exits separator assembly 120 is collected in a collection portion, such as collection portion 143. Housing 140 may assist in collection of the fraction which radially exits separator assembly 120. In addition, housing 140 may assist in directing the fraction which radially exits separator assembly 120 toward collection portion 143 and/or towards an outlet, such as first outlet 130. The portion of the feed stock generally having a greater roundness and/or a greater sphericity subsequently leaves collection portion 143 through first outlet 130. The exiting processed feed stock from first outlet 130 may then be further collected, stored, further processed, used as an aggregate, and/or used as a proppant.

The portion of the feed stock having a lower roundness and/or a lower sphericity and which generally remains in separator assembly 120 will reach termination member 128 and subsequently be directed from separator assembly 120 to second outlet 132. For example, the portion of the feed stock having a lower roundness and/or a lower sphericity will generally be directed into at least one aperture provided in central member 124 by termination member 128. The portion of the feed stock having a lower roundness and/or a lower sphericity will then travel to second outlet 132, exiting assembly 100. The exiting processed feed stock from second outlet 132 may then be further collected, stored, further processed, and/or discarded.

It should be appreciated in one or more examples of embodiments of assembly 100, that the desired property for the processed feed stock which exits assembly 100 radially may be adjusted, targeted, and/or optimized. While the above steps of operation and use of assembly 100 references processing of a feed stock by sphericity and/or roundness, assembly 100 may process a feed stock based upon one or more other desired properties of the feed stock.

For example, in one or more examples of embodiments, the feed stock may be processed according to particle size. In such an example, as the feed stock travels along each associated flight 122, moving helically around central member 124, the feed stock which is of a greater size or a greater diameter will generally travel towards the distal end 123 of each associated flight 122. Feed stock which is of a smaller size or smaller diameter will generally remain on each associated flight 122. For example, feed stock which is of a smaller size or smaller diameter may generally remain closer in proximity to the proximal end 121 than the distal end 123 of each associated flight 122.

As the feed stock continues to helically travel along each associated flight 122, the portion of the feed stock having a greater size or greater diameter will generally eventually exit the plurality of flights 122 radially. Stated otherwise, the portion of the feed stock having a greater size or greater diameter will generally travel beyond distal end 123 and exit separator assembly 120. The portion of the feed stock having a smaller size or smaller diameter and which does not exit the plurality of flights 122 radially will generally remain in contact with each associated flight 122 until reaching termination member 128.

The portion of the feed stock having a greater size or greater diameter and which radially exits separator assembly 120 is collected in a collection portion, such as collection portion 143. The portion of the feed stock having a greater size or greater diameter subsequently leaves collection portion 143 through first outlet 130. The exiting processed feed stock from first outlet 130 may then be further collected, stored, further processed, used as an aggregate, and/or used as a proppant.

The portion of the feed stock having a smaller size or smaller diameter and which generally remains in separator assembly 120 will reach termination member 128 and subsequently be directed from separator assembly 120 to second outlet 132. For example, the portion of the feed stock having a smaller size or smaller diameter will generally be directed into at least one aperture provided in central member 124 by termination member 128. The portion of the feed stock having a smaller size or smaller diameter will generally then travel to second outlet 132, exiting assembly 100. The exiting processed feed stock from second outlet 132 may then be further collected, stored, further processed, and/or discarded.

As another example, in one or more examples of embodiments, the feed stock may be processed according to particle surface texture. In such an example, as the feed stock travels along each associated flight 122, moving helically around central member 124, the feed stock which has a surface texture which is smoother or less rough will generally travel towards the distal end 123 of each associated flight 122. Feed stock which has a surface texture which is less smooth or more rough will generally remain on each associated flight 122. For example, feed stock which has a surface texture which is less smooth or more rough may generally remain closer in proximity to the proximal end 121 than the distal end 123 of each associated flight 122.

As the feed stock continues to helically travel along each associated flight 122, the portion of the feed stock which has a surface texture which is smoother or less rough will generally eventually exit the plurality of flights 122 radially. Stated otherwise, the portion of the feed stock which has a surface texture which is smoother or less rough will generally travel beyond distal end 123 and exit separator assembly 120. The portion of the feed stock which has a surface texture which is less smooth or more rough and which does not exit the plurality of flights 122 radially will generally remain in contact with each associated flight 122 until reaching termination member 128.

The portion of the feed stock which has a surface texture which is smoother or less rough and which radially exits separator assembly 120 is collected in a collection portion, such as collection portion 143. The portion of the feed stock which has a surface texture which is smoother or less rough subsequently leaves collection portion 143 through first outlet 130. The exiting processed feed stock from first outlet 130 may then be further collected, stored, further processed, used as an aggregate, and/or used as a proppant.

The portion of the feed stock which has a surface texture which is less smooth or more rough and which generally remains in separator assembly 120 will reach termination member 128 and subsequently be directed from separator assembly 120 to second outlet 132. For example, the portion of the feed stock which has a surface texture which is less smooth or more rough will be directed into at least one aperture provided in central member 124 by termination member 128. The portion of the feed stock which has a surface texture which is less smooth or more rough will then travel to second outlet 132, exiting assembly 100. The exiting feed stock from second outlet 132 may then be further collected, stored, further processed, and/or discarded.

While the above examples of embodiments of assembly 100 reference processing feed stock according to one or more desired or targeted feed stock properties, including, particle shape, particle size, and/or particle surface texture, the exemplary list of properties is not exhaustive. For example, the feed stock may be processed by assembly 100 targeting specific gravity of the feed stock, rollability of the particles and/or feed stock (i.e. how well the feed stock rolls or the rolling velocity of the feed stock), and/or an interaction of the particles and/or feed stock with the assembly material or components.

In addition, in one or more examples of embodiments, one or more assemblies 100 may be provided in series, or stacked, or otherwise operated as stages. In these embodiments, each stage of the assembly 100 will further purify, beneficiate, fractionate, sort, or concentrate the feed stock based upon the desired or targeted feed stock property. For example, a first stage of one or more assemblies 100 may process feed stock in accordance with a desired or targeted property, including particle shape, particle size, particle surface texture, particle specific gravity, particle rollability, and/or particle interaction with the assembly material. The processed feed stock which exits the one or more assemblies 100 of the first stage through a processed feed stock discharge, for example the first outlet 130 and/or second outlet 132, may subsequently be further processed in a second stage of one or more assemblies 100. The second stage may further process the feed stock based upon the same desired or targeted property as the first stage, or may process the feed stock based upon a different desired or targeted property as the first stage. In addition, any number of stages may be provided with the processed feed stock which exits the one or more assemblies 100 of the previous stage through a processed feed stock discharge, for example the first outlet 130 and/or second outlet 132, being further processed by the next stage.

One or more additional acquisition assemblies 410, 420, 430, 440 may be incorporated into assembly 100, and more specifically separator assembly 120, to acquire, fractionate, retain, or separate or remove or produce one or more desired fractions of processed feed stock.

Figure 9:
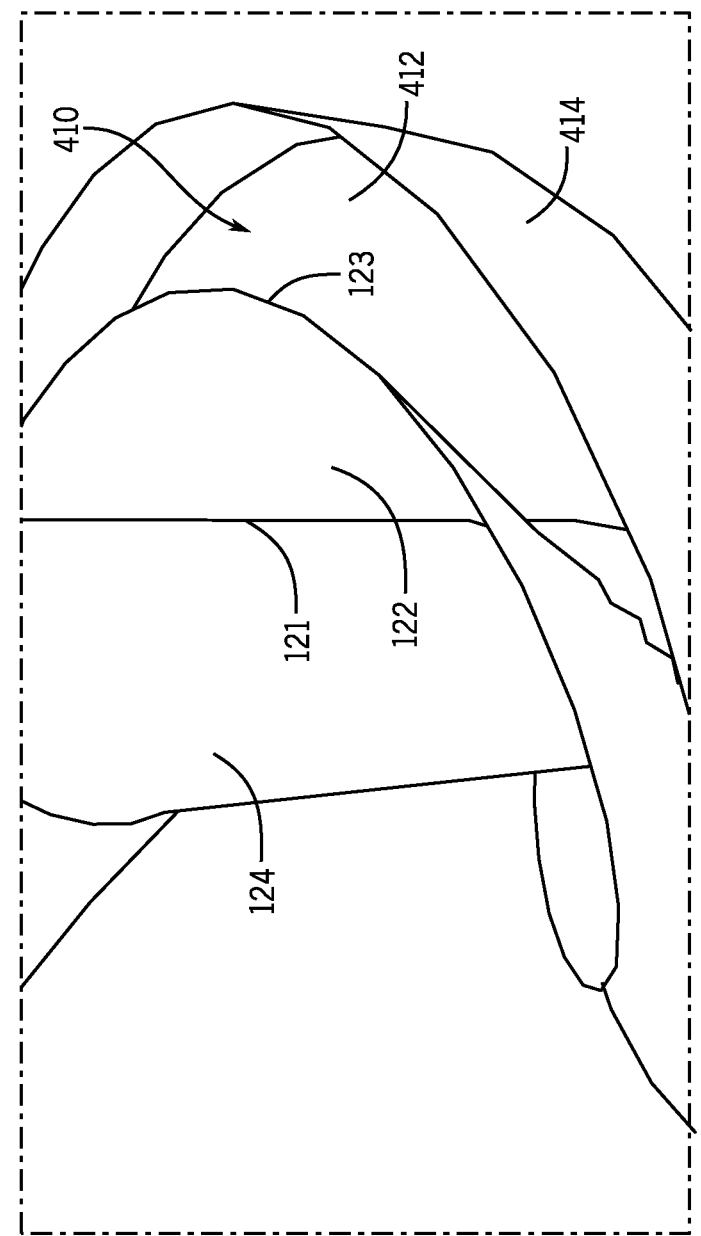
FIG. 9 is a close up view of one or more examples of embodiments of a portion of the processing assembly of FIG. 1, illustrating a collection portion.

FIG. 9 illustrates one or more examples of embodiments of a second collection portion or collection assembly 410. Collection portion 410 includes a first collection member 412 coupled to a second collection member 414. Preferably, first collection member 412 may be coupled to central member 124. In addition, first collection member 412 may be provided approximately parallel or angled relative to the plurality of flights 122 of separator 120. First collection member 412 may be helically or helically-like provided about central member 124 for a portion of the helical or helical-like revolutions of flights 122. First collection member 412 generally has a radius or width extending away from central member 124 which is greater than the width or radius of flights 122. In addition, first collection member 412 may be provided on the exit end 126 of the plurality of flights. Around the perimeter of first collection member 412 opposite central member 124 may be the second collection member 414. As illustrated, second collection member 414 may be provided at an angle to first collection member 412. In addition, second collection member 414 may be provided at an angle to flights 122. Second collection member 414 is preferably provided a distance radially away from flights 122, and more specifically a distance radially away from the distal end 123 of flights 122. Collection portion 410 assists in collecting processed feed stock which radially leaves separator 120.

Figure 10:
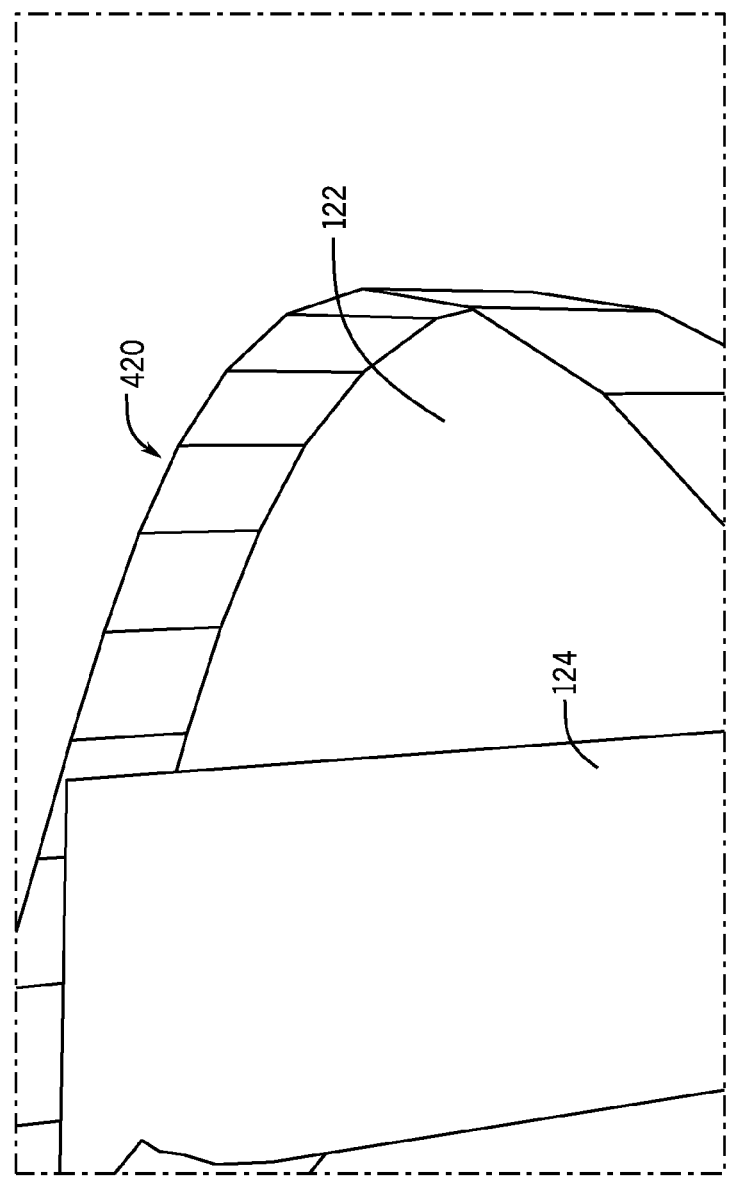
FIG. 10 is a close up view of one or more examples of embodiments of a portion of the processing assembly of FIG. 1, illustrating a rim provided about a portion of a flight.

FIG. 10 illustrates one or more examples of embodiments of a portion of a flight 122 having a rim or radial rim 420. Rim 420 is preferably provided on distal end 123 and extends perpendicular or angled relative to flight 122. Rim 420 is provided to restrict loaded or processed feedstock from exiting radially outward from flight 122, past the distal end 123. This forces the feed stock to be additionally processed by the flight 122 incorporated into assembly 100, and more specifically separator 120.

FIG. 11 illustrates one or more examples of embodiments of a portion of a plurality of flights 122 having a splitter assembly 430. Splitter assembly 430 may include a splitter member 432 which bisects a portion of the flights 122 between the proximal end 121 and distal end 123. Splitter member 432 may also contact the surface of flights 122. The splitter member 432 may be coupled to a receiving chamber 434 having a first receiving portion 436 and a second receiving portion 438. The splitter member 432 will separate the processed feedstock helically traveling along flights 122. The splitter member 432 will separate the processed feedstock into one of the first receiving portion 436 or second receiving portion 438, generating at least two fractions of processed feedstock. It should be appreciated that in one or more examples of embodiments, splitter member 432 may be provided at any desired or targeted location between proximal end 121 and distal end 123. In addition, in one or more examples of embodiments, splitter member 432 may be adjustable to any desired or targeted location between proximal end 121 and distal end 123. Further, in one or more examples of embodiments, splitter member 432 may not be in contact with the surface of one or more flights 122. In one or more examples of embodiments, a plurality of splitter members 432 may be provided between proximal end 121 and distal end 123. The plurality of splitter member 432 may separate the processed feedstock into a plurality of fractions, directing the feedstock into a plurality of receiving portions. In one or more examples of embodiments, one or more receiving portions may be in communication with one or more first ends 125 of one or more additional processing assemblies 100 and/or separator assemblies 120. Further, splitter member 432 may separate the processed feedstock into one or more fractions and direct the one or more fractions to one or more first ends 125 of one or more additional processing assemblies 100 and/or separator assemblies 120. In addition, in one or more examples of embodiments, a splitter member 432 may be provided to fewer than all of the plurality of flights 122.

Figure 12:
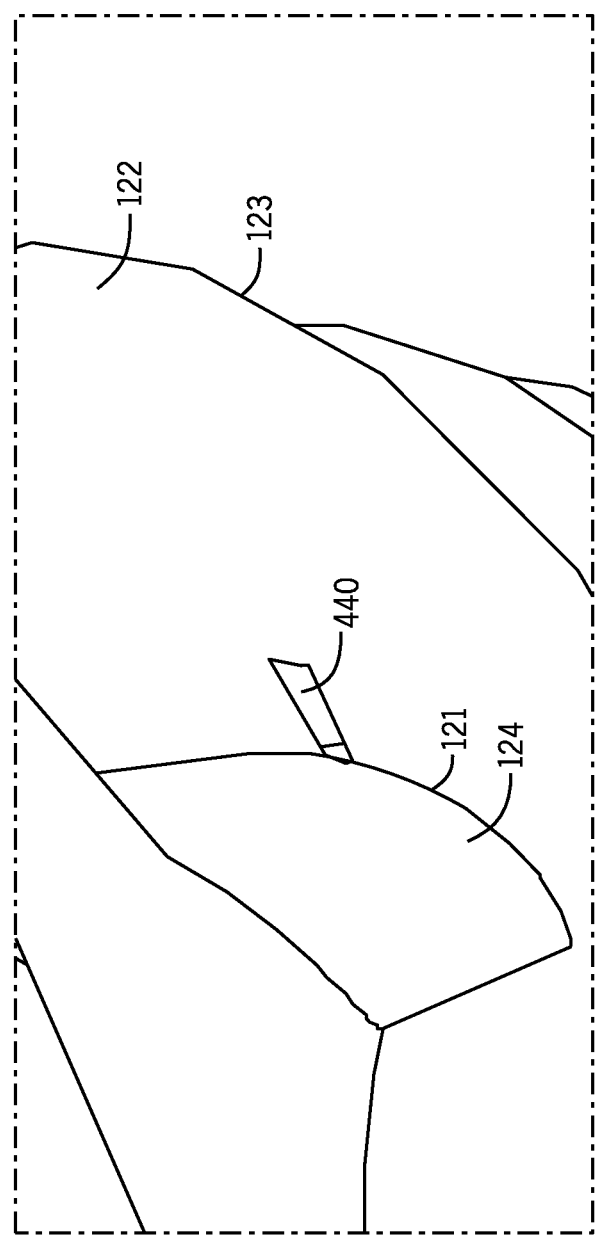
FIG. 12 is a close up view of one or more examples of embodiments of a portion of the processing assembly of FIG. 1, illustrating one or more slots provided in a first portion of a flight.
Figure 13:
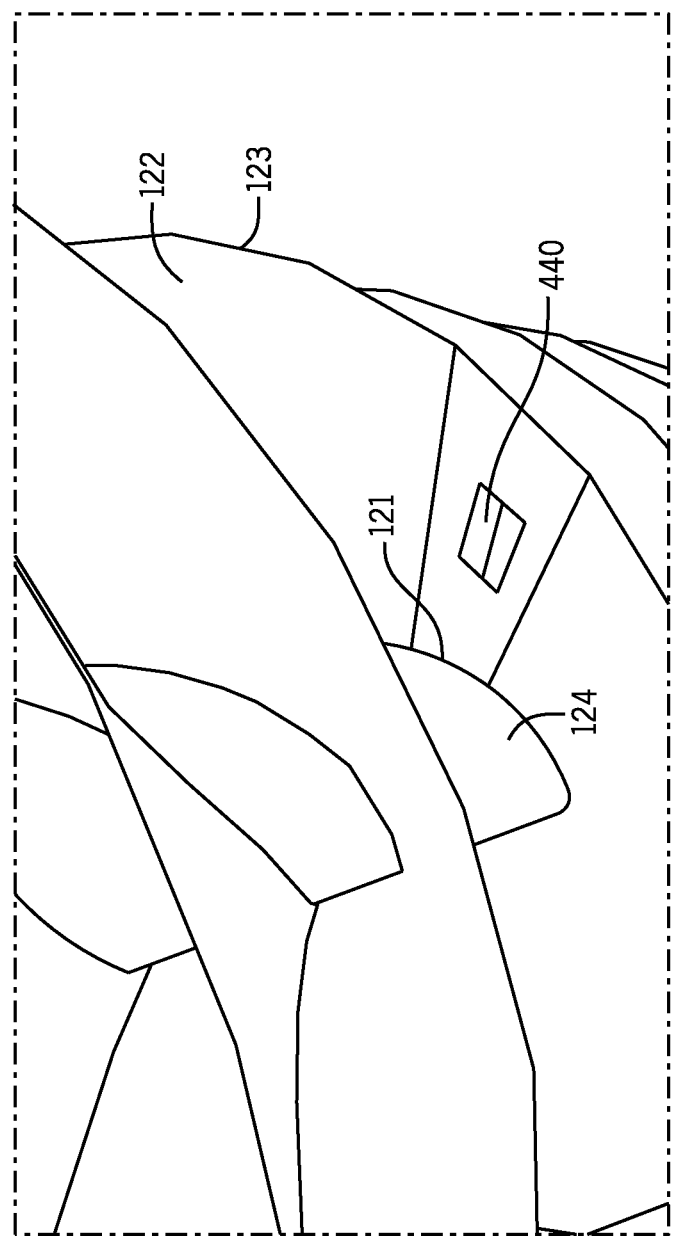
FIG. 13 is a close up view of one or more examples of embodiments of a portion of the processing assembly of FIG. 1, illustrating one or more slots provided in a second portion of a flight.
Figure 14:
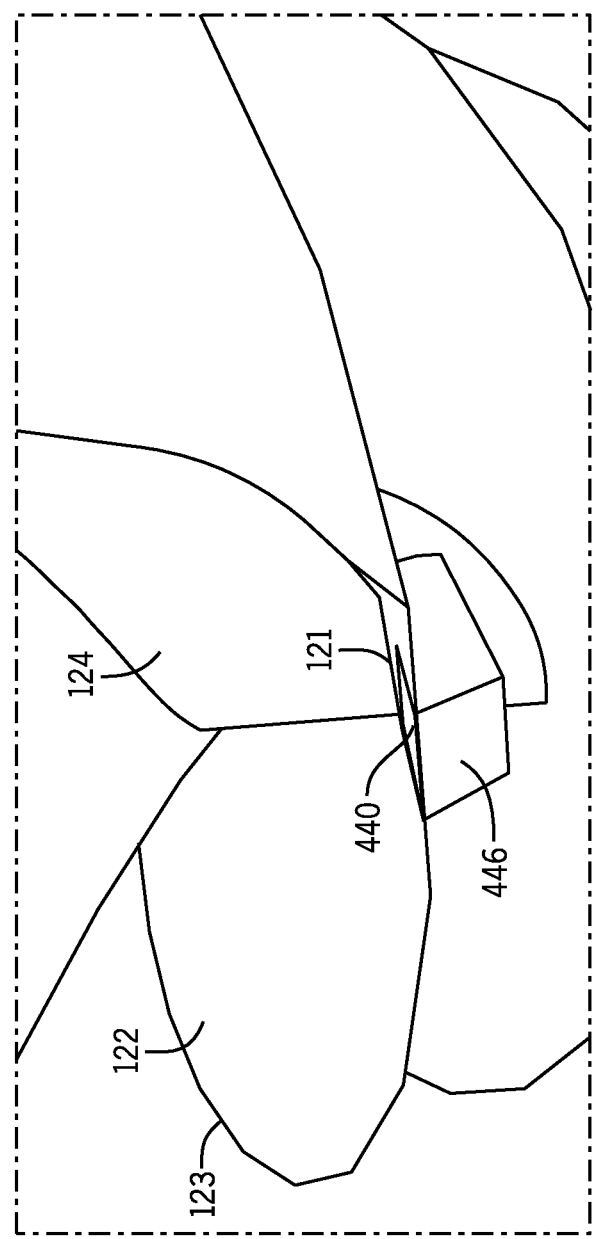
FIG. 14 is a close up view of one or more examples of embodiments of a portion of the processing assembly of FIG. 1, illustrating one or more slots provided in a third portion of a flight.
Figure 15:
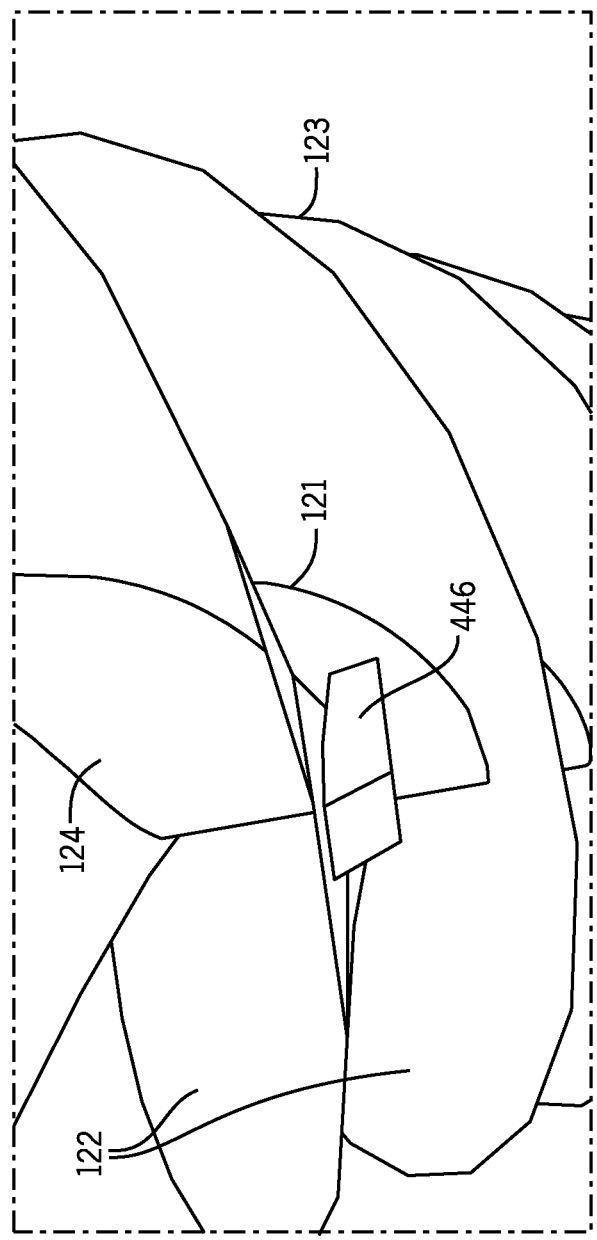
FIG. 15 is a close up view of one or more examples of embodiments of a portion of the processing assembly of FIG. 1, illustrating a collection assembly for collecting processed feedstock removed by one or more slots provided in a flight.
Figure 16:
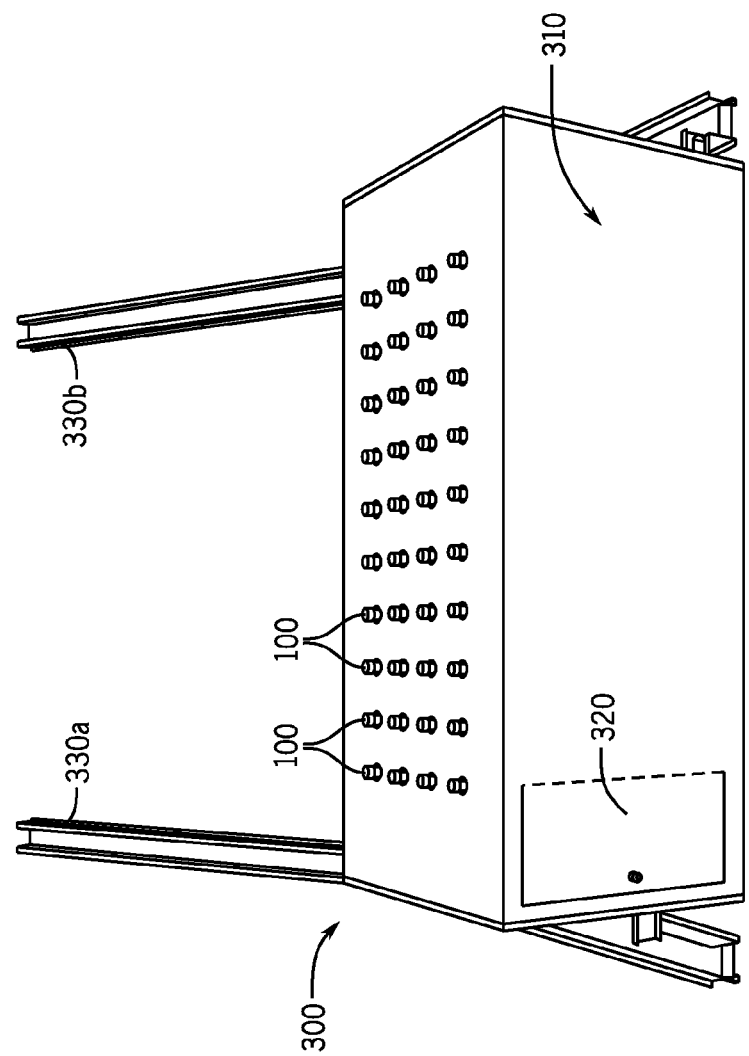
FIG. 16 is an isometric view of one or more examples of embodiments of a processing system implementing at least one processing assembly of FIG. 1.
Figure 17:
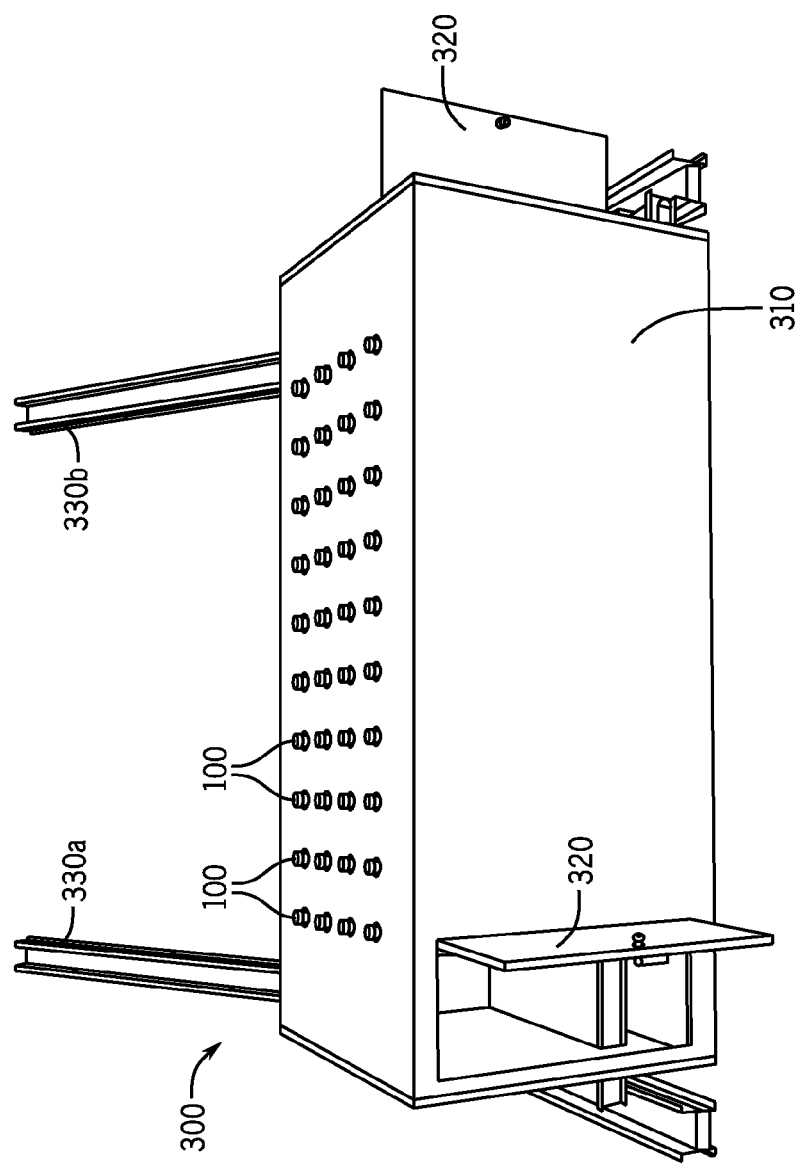
FIG. 17 is an isometric view of the processing system of FIG. 16 illustrating the access doors in an open position.

FIGS. 12-15 illustrate one or more examples of embodiments of a slot or radial slot 440 provided in a flight 122. As illustrated, slot 440 may be provided at a desired position radially extending across flight 122. Referring to FIG. 12, slot 440 may be provided at a position radially extending from near proximal end 121 toward distal end 123. Referring to FIG. 13, slot 440 may be provided at a position between proximal and distal ends 121, 123 and radially extending across flight 122. Referring to FIG. 14, slot 440 may be provided at a position radially extending from a position on flight 122 near distal end 123. Slot 440 may be provided at any desired or targeted location across one or more flights 122 to collect a desired or targeted portion or fraction of the processed feedstock. In addition, slot 440 may be any suitable or desired radial length to collect a portion of a fraction of the processed feedstock. In addition, slot 440 may be any suitable or desired width, which is perpendicular to the radial length, to collect a portion of a fraction of the processed feedstock. Referring to FIG. 15, a collection assembly 446 may be in communication with slot 440. For example, collection assembly 446 may be provided on the underside of slot 440, and further on the underside of flight 122. Collection assembly 446 may collect the portion of a fraction of the processed feedstock which falls into slot 440 and remove that collected processed feedstock from assembly 100. For example, collection assembly 446 may transport the collected processed feedstock toward the proximal end 121 of the flights, such as to the hollow central member 124. As another example, collection assembly 446 may transport the collected processed feedstock toward the distal end 123 of the flights, such as radially outward to a separate collection assembly, collection bin, or collection column (not shown).

Referring to FIGS. 16-19, one or more examples of embodiments of a processing system 300 for processing feed stock is provided. Processing system 300 may include a plurality of processing assemblies 100 or certain elements thereof Referring to FIGS. 16 and 17, processing system 300 may include a modular housing 310 which surrounds the plurality of processing assemblies 100. Housing 310 may include a plurality of access hatches or doors 320. The access doors 320 may allow one or more users to access the interior of housing 310 where the plurality of processing assemblies 100 are housed. In addition, housing 310 may be provided on or integrated with parallel inclined conveyors 330a, 330b to allow for removal of at least two fractions of processed feed stock from processing system 300.

Figure 18:
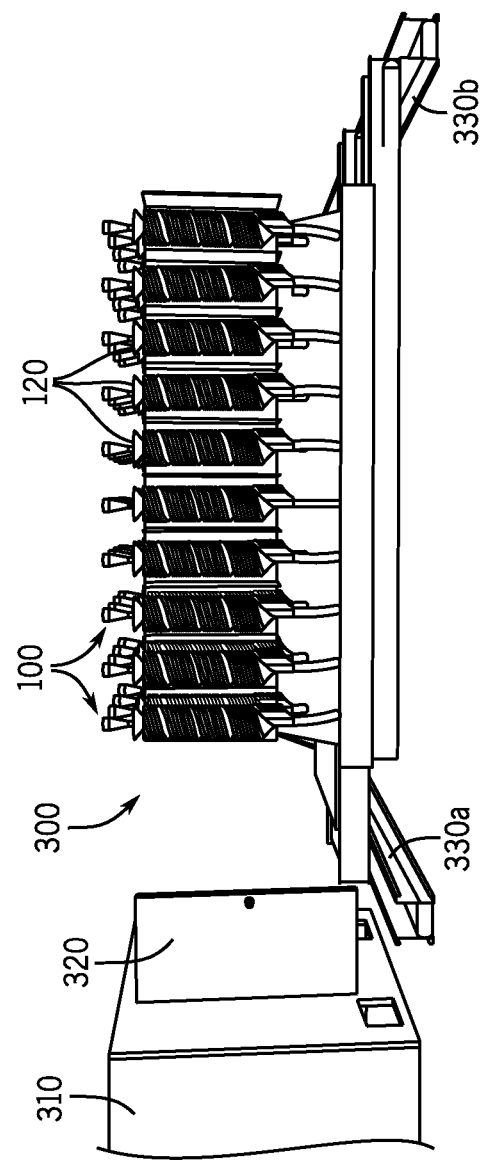
FIG. 18 is a side view of the processing system of FIG. 16 illustrating the housing as removed.
Figure 19:
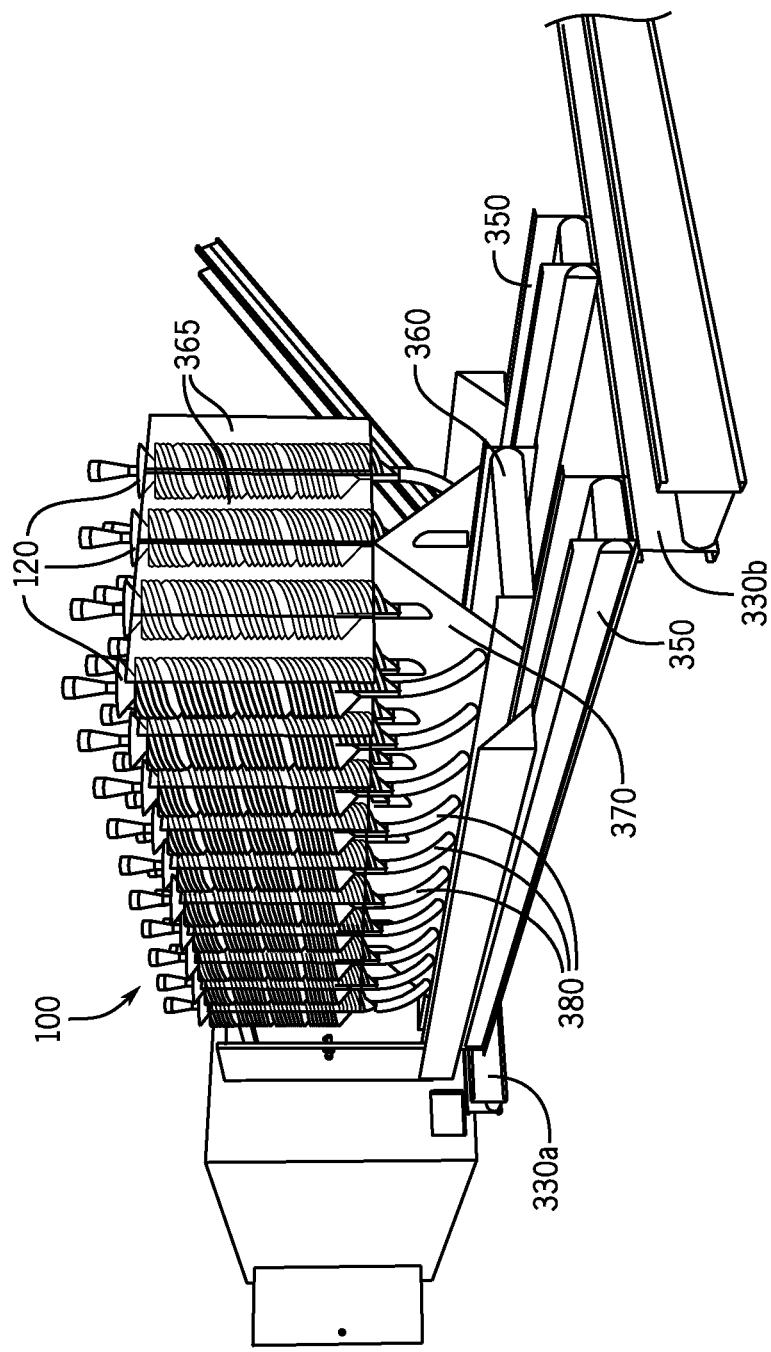
FIG. 19 is an isometric view of the processing system of FIG. 18 illustrating the housing as removed.

FIGS. 18 and 19 illustrate processing system 300 with the housing 310 removed. The processing system 300 includes a plurality of processing assemblies 100. In addition, the processing system 300 includes a plurality of separator assemblies 120. In addition a plurality of conveyors 350, 360 may be provided. Conveyors 350 may convey a first fraction of processed feed stock, for example feed stock which escapes each of the separator assemblies 120 radially. For example, conveyors 350 convey the first fraction of processed feed stock to conveyor 330b. Conveyor 360 may convey a second fraction of processed feed stock, for example feed stock which does not escape each separator assembly 120 radially. For example, conveyor 360 conveys the second fraction of processed feed stock to conveyor 330a. In addition, a plurality of curtains or planes or enclosures 365 may be provided between one or more separators 120. Curtains 365 may assist in directing the first fraction of processed feed stock toward conveyor 350. In addition, curtains 365 may assist in preventing particles of the first fraction from radially escaping one separator assembly 120 and entering an adjacent separator assembly 120. Curtains 365 may be provided in a first plane perpendicular to conveyor 350, or in a second plane parallel to conveyor 350. In addition, a diverter 370 may be provided for assisting in diverting the first fraction of processed feed stock to conveyor 350. A plurality of extraction tubes 380 may be provided for transporting the second fraction of processed feed stock from each separator assembly 120 to conveyor 360. In one or more examples of embodiments, extraction tubes 380 may be in communication with separator assembly 120. In addition, extraction tubes 380 may pass through respective apertures provided in diverter 370 to allow the second fraction to travel to conveyor 360.

In one or more examples of embodiments of system 300, system 300 may include a prescreening assembly (not shown) to prescreen raw feed stock. For example, the prescreening assembly may be any suitable screening apparatus to screen, disperse, or vibrate feed stock prior to introduction to separator assembly 120. Such a suitable prescreening apparatus may screen feed stock to a suitable size fraction, for example a 20/40 fraction. However, it should be appreciated that a suitable or desired prescreening may be implemented, for example, but not limited to prescreening feed stock to a size fraction of 6/12, 8/16, 12/18, 12/20, 16/20, 20/40, 16/30, 30/50, 40/60, 40/70, 70/140, 100 mesh, and/or any other suitable or desired size fraction. It should also be appreciated that one or more fractions of feed stock processed by assembly 100 and/or separator 120 may be screened or post-screened based upon size to modify the size distribution profile, mean particle size or diameter, or median particle size or diameter of one or more fractions.

Figure 20A:
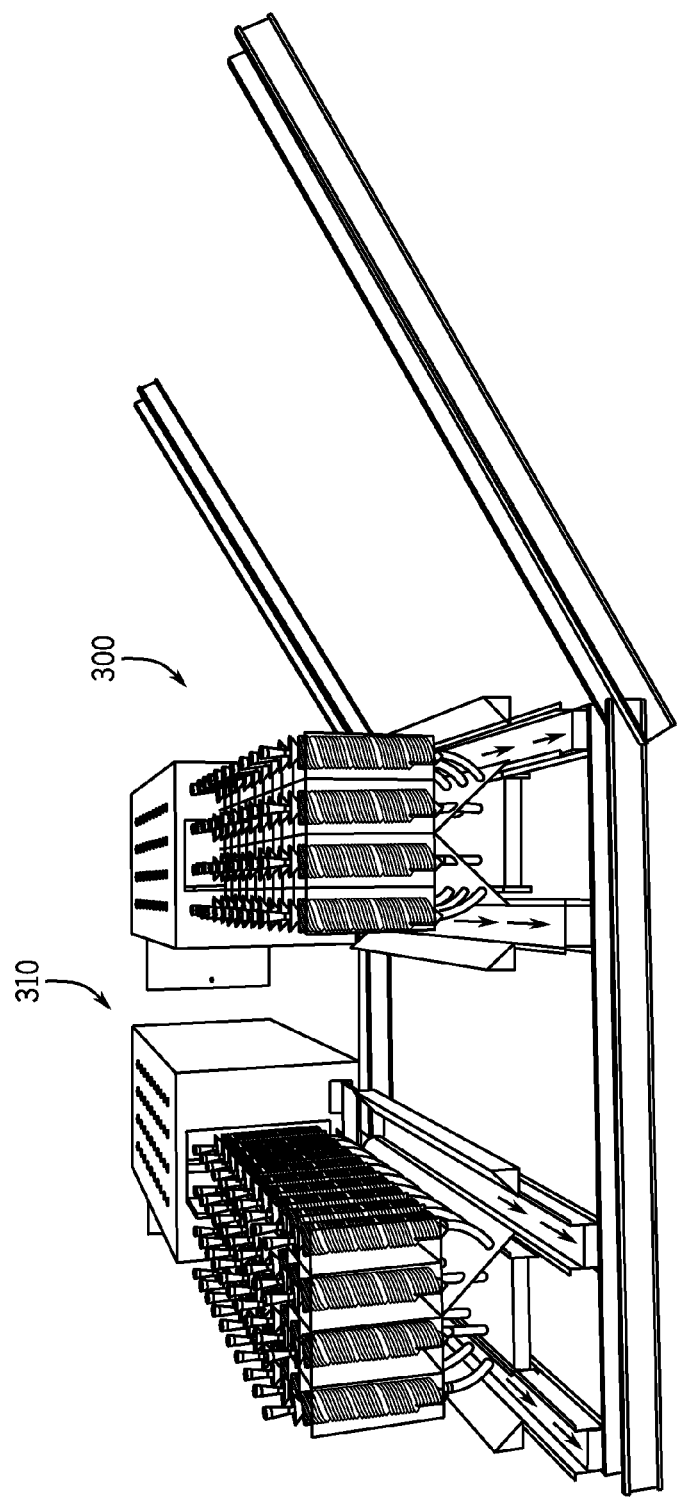
FIG. 20A is an isometric view of one or more examples of embodiments of a processing system implementing a plurality of processing systems in parallel, each having at least one processing assembly of FIG. 1

FIGS. 20A and 20B illustrate one or more examples of embodiments of a system 300 employing a plurality of modular housings 310. As illustrated in FIG. 20A, the plurality of modular housings 310 operates in parallel to process feedstock into at least two fractions. As illustrated in FIG. 20B, a plurality of modular housings 310 may be arranged to operate in series, with one or more modular housings 310 operating as a plurality of processing stages. The plurality of modular housings 310 may be arranged to operate in series, and/or may be provided in an elevated or stacked arrangement in order to gravity feed feed stock from stage to stage. In addition, in one or more examples of embodiments, a plurality of modular housings 310 may be provided for each processing stage.

The resulting processed feed stock from assembly 100 produce different aggregate grades for different applications or uses. The feed stock may be processed by assembly 100 and/or separator 120 one or more times in order for particles having one or more targeted or desired properties or characteristics to be separated as one or more fractions from the processed feed stock. As an example, one or more examples of an aggregate classification, and more specifically one or more classifications of sand processed by assembly 100 and/or separator 120, having certain targeted properties is illustrated in the following table:

It should be appreciated that a distribution may be a component of a profile. For example, a particle size distribution may be a component of a particle size profile, a particle roundness distribution may be a component of a particle roundness profile, and/or a particle sphericity distribution may be a component of a particle sphericity profile.

The following Examples provide an illustration of one or more examples of embodiments of carrying out the invention disclosed herein. More specifically, the following Examples provide an illustration of one or more fractions of a feed stock processed by assembly 100 and/or separator 120. The following Examples are provided for illustration and are not intended to limit the scope of the invention.

Figure 21:
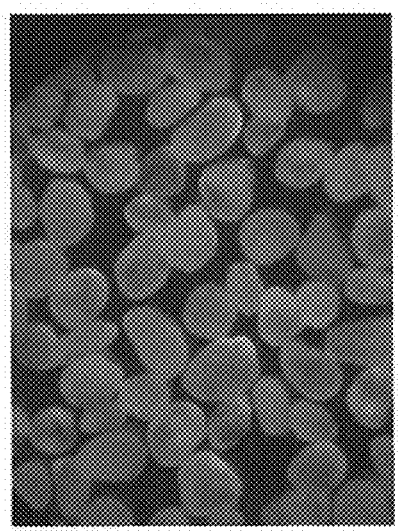
FIG. 21 is a photomicrograph of one or more examples of particles provided in an exemplary feed stock, the feed stock having a 20/30 size fraction, the photomicrograph being 37.5× magnification.

A sample feed stock of sand having a 20/30 grade or size fraction is illustrated in FIG. 21. The feed stock was provided as a feed stock to separator 120. The feed stock has an average K&S Sphericity Value of 0.75 and an average K&S Roundness Value of 0.82. In addition, the feed stock has a roundness profile of 70% of the particles≤0.8, 15% of the particles≤0.7, and 0% of the particles≤0.6. In addition, the feed stock has a sphericity and roundness profile of 15% of

| Classification | Average Particle Sphericity (K&S) | Average Particle Roundness (K&S) | Additional Properties |
|---|---|---|---|
| Frac Sand | | | |
| Abrasive Sand | ≥0.6 | ≥0.6 | ≥15% of the particles have a roundness ≤0.7; ≤15% of the particles have a roundness ≥0.9; and ≤15% of the particles have a sphericity ≥0.9 |
| Highly Abrasive Sand | | | ≥50% of the particles have a roundness ≤0.7; ≥20% of the particles have a roundness ≤0.6; <25% of the particles have a roundness ≥0.8; <25% of the particles have a sphericity ≥0.8; and Includes the additional properties of the Abrasive Sand classification |
| Abrasion-Resistant Sand | ≥0.79 | ≥0.79 | <15% of the particles have a roundness ≤0.7; >15% of the particles have a roundness ≥0.9; and >15% of the particles have a sphericity ≥0.9 |
| Highly Abrasion-Resistant Sand | ≥0.80 | ≥0.80 | <10% of the particles have a roundness ≤0.7; >80% of the particles have a roundness ≥0.8; >80% of the particles have a sphericity ≥0.8; and Includes the additional properties of the Abrasion-Resistant Sand classification |
| Spherical Sand | ≥0.85 | ≥0.85 | <10% of the particles have a roundness ≤0.7; >85% of the particles have a roundness ≥0.8; >85% of the particles have a sphericity ≥0.8; and Includes the additional properties of the Highly Abrasion Resistant Sand |
| Super Spherical Sand | ≥0.88 | ≥0.88 | <5% of the particles have a roundness ≤0.7; >90% of the particles have a roundness ≥0.8; >90% of the particles have a sphericity ≥0.8; and Includes the additional properties of the Spherical Sand classification | the particles having a sphericity and roundness≥0.9 and 55% of the particles having a sphericity and roundness≥0.8. The sphericity and roundness profile is the percentage of particles having both a sphericity and a roundness within the identified value range.

EXAMPLE 1

Figure 22:
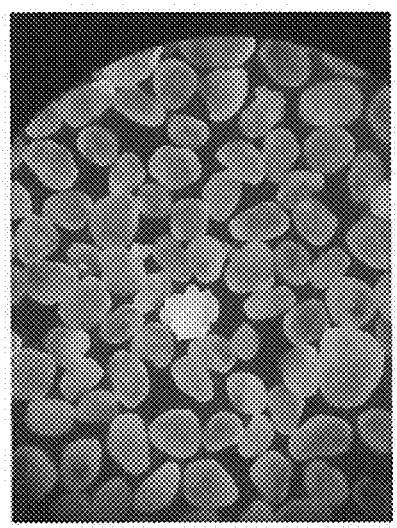
FIG. 22 is a photomicrograph of a captured processed fraction of highly abrasive particles following processing of the feed stock of FIG. 21, the photomicrograph being 37.5× magnification.

The feed stock illustrated in FIG. 21 was processed by assembly 100, and more specifically separator 120. The feed stock was processed on a separator 120 having a six inch flight radius. In addition, splitter assembly 430 was provided along flights 122. The splitter assembly 430 was provided one inch radially away from central member 124. The resulting processed feed stock fraction between proximal end 121 or central member 124 and splitter assembly 430, and which was acquired within the one inch radial distance, was captured. The captured processed fraction is highly abrasive and is illustrated in FIG. 22. The captured processed fraction has an average K&S Sphericity Value of 0.68 and an average K&S Roundness Value of 0.73. In addition, the captured processed fraction has a roundness profile of 80% of the particles≤0.8, 60% of the particles≤0.7, and 20% of the particles≤0.6. In addition, the captured processed fraction has a sphericity and roundness profile of 5% of the particles having a sphericity and roundness≥0.9 and 15% of the particles having a sphericity and roundness≥0.8.

EXAMPLE 2

Figure 23:
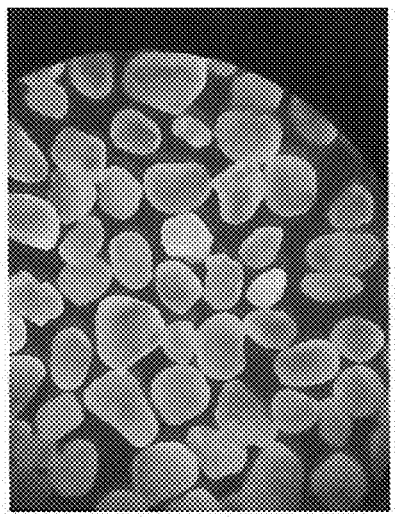
FIG. 23 is a photomicrograph of a captured processed fraction of abrasive particles following processing of the feed stock of FIG. 21, the photomicrograph being 37.5× magnification.

The feed stock illustrated in FIG. 21 was processed by assembly 100, and more specifically separator 120. The feed stock was processed on a separator 120 having a six inch flight radius. In addition, splitter assembly 430 was provided along flights 122. The splitter assembly 430 was provided three inches radially away from central member 124. The resulting processed feed stock fraction between proximal end 121 or central member 124 and splitter assembly 430, and which was acquired within the three inch radial distance, was captured. The captured processed fraction is abrasive and is illustrated in FIG. 23. The captured processed fraction has an average K&S Sphericity Value of 0.76 and an average K&S Roundness Value of 0.77. In addition, the captured processed fraction has a roundness profile of 65% of the particles≤0.8, 45% of the particles≤0.7, and 10% of the particles≤0.6. In addition, the captured processed fraction has a sphericity and roundness profile of 5% of the particles having a sphericity and roundness≥0.9 and 40% of the particles having a sphericity and roundness≥0.8.

EXAMPLE 3

Figure 24:
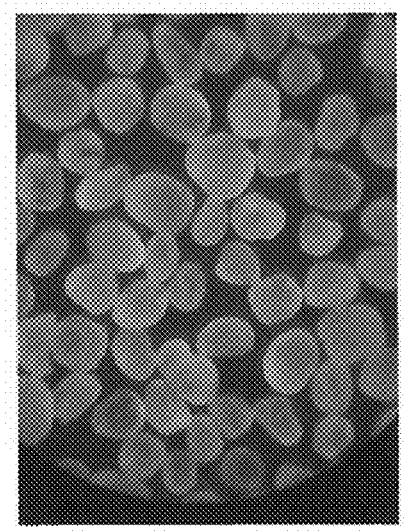
FIG. 24 is a photomicrograph of a captured processed fraction of abrasion-resistant particles following processing of the feed stock of FIG. 21, the photomicrograph being 37.5× magnification.

The feed stock illustrated in FIG. 21 was processed by assembly 100, and more specifically separator 120. The feed stock was processed on a separator 120 having a six inch flight radius. In addition, splitter assembly 430 was provided along flights 122. The splitter assembly 430 was provided three inches radially away from proximal end 121 or central member 124. The resulting processed feed stock fraction between splitter assembly 430 and distal end 123, and which was acquired within the three inch radial distance between splitter assembly 430 and distal end 123 (but which excluded particles escaping radially from separator 120) was captured. The captured processed fraction is abrasion-resistant and is illustrated in FIG. 24. The captured processed fraction has an average K&S Sphericity Value of 0.83 and an average K&S Roundness Value of 0.86. In addition, the captured processed fraction has a roundness profile of 35% of the particles≤0.8, 10% of the particles≤0.7, and 0% of the particles≤0.6. In addition, the captured processed fraction has a sphericity and roundness profile of 30% of the particles having a sphericity and roundness≥0.9 and 80% of the particles having a sphericity and roundness≥0.8.

EXAMPLE 4

Figure 25:
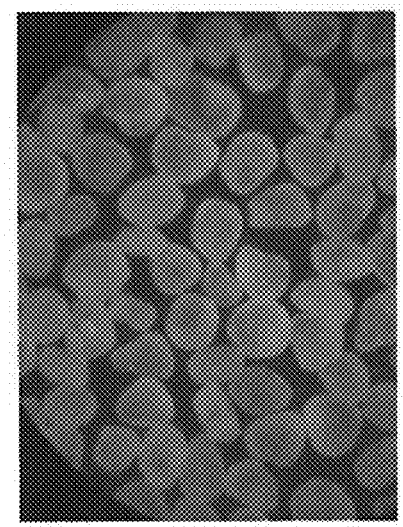
FIG. 25 is a photomicrograph of a captured processed fraction of abrasion-resistant particles following processing of the feed stock of FIG. 21, the photomicrograph being 37.5× magnification.

The feed stock illustrated in FIG. 21 was processed by assembly 100, and more specifically separator 120. The feed stock was processed on a separator 120 having a six inch flight radius. In addition, splitter assembly 430 was provided along flights 122. The splitter assembly 430 was provided three inches radially away from proximal end 121 or central member 124. The resulting processed feed stock fraction between splitter assembly 430 and distal end 123, and which was acquired within the three inch radial distance, was captured. The captured processed fraction was then mixed with a second fraction of captured processed feed stock. Specifically, the second fraction was the fraction which exited the flights radially past the distal end 123 during processing through separator 120. The mixture of processed fractions is abrasion-resistant and is illustrated in FIG. 25. The mixture of processed fractions has an average K&S Sphericity Value of 0.79 and an average K&S Roundness Value of 0.82. In addition, the captured processed fraction has a roundness profile of 70% of the particles≤0.8, 10% of the particles≤0.7, and 5% of the particles≤0.6. In addition, the captured processed fraction has a sphericity and roundness profile of 25% of the particles having a sphericity and roundness≥0.9 and 65% of the particles having a sphericity and roundness≥0.8.

EXAMPLE 5

Figure 26:
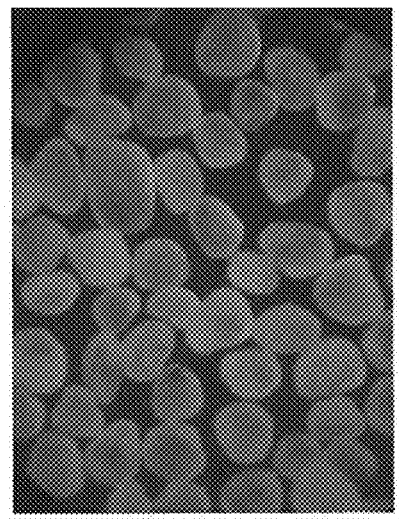
FIG. 26 is a photomicrograph of a captured processed fraction of highly abrasion-resistant particles following processing of the feed stock of FIG. 21, the photomicrograph being 37.5× magnification.

The feed stock illustrated in FIG. 21 was processed by assembly 100, and more specifically separator 120. The feed stock was processed on a separator 120 having a six inch flight radius. In addition, splitter assembly 430 was provided along flights 122. The splitter assembly 430 was provided four inches radially away from proximal end 121 or central member 124. The resulting processed feed stock fraction between splitter assembly 430 and distal end 123, and which was acquired within the two inch radial distance, was captured. The captured processed fraction was then mixed with a second fraction of captured processed feed stock. Specifically, the second fraction was the fraction which exited the flights radially past the distal end 123 during processing through separator 120. The mixture of processed fractions is highly abrasion-resistant and is illustrated in FIG. 26. The mixture of processed fractions has an average K&S Sphericity Value of 0.83 and an average K&S Roundness Value of 0.85. In addition, the mixture of processed fractions has a roundness profile of 50% of the particles≤0.8, 5% of the particles≤0.7, and 0% of the particles≤0.6. In addition, the mixture of processed fractions has a sphericity and roundness profile of 25% of the particles having a sphericity and roundness≥0.9 and 85% of the particles having a sphericity and roundness≥0.8.

Figure 27:
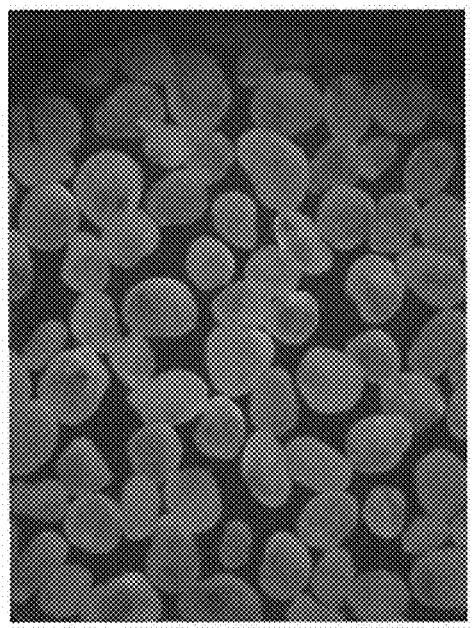
FIG. 27 is a photomicrograph of one or more examples of particles provided in an exemplary feed stock, the feed stock having a 20/40 size fraction, the photomicrograph being 37.5× magnification.

As an additional set of examples, a second sample feed stock of sand having a 20/40 grade or size fraction is illustrated in FIG. 27. The feed stock was provided as a feed stock to separator 120. The feed stock has an average K&S Sphericity Value of 0.78 and an average K&S Roundness Value of 0.78. In addition, the feed stock has a roundness profile of 60% of the particles≤0.8, 25% of the particles≤0.7, and 15% of the particles≤0.6. In addition, the feed stock has a sphericity and roundness profile of 15% of the particles having a sphericity and roundness≥0.9 and 60% of the particles having a sphericity and roundness≥0.8.

EXAMPLE 6

Figure 28:
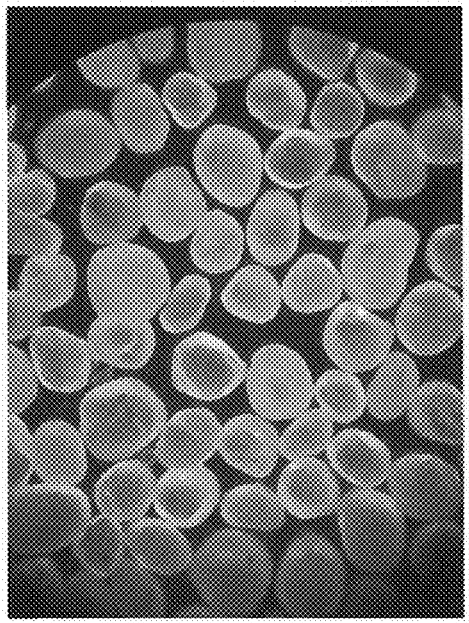
FIG. 28 is a photomicrograph of a captured processed fraction of spherical particles following processing of the feed stock of FIG. 27, the photomicrograph being 37.5× magnification.

The second feed stock illustrated in FIG. 27 was processed by assembly 100, and more specifically separator 120. The feed stock was processed on a separator 120 having a five inch flight radius. The resulting processed feed stock fraction which exited the flights radially past the distal end 123 during processing through separator 120 was captured. The captured processed fraction is spherical and is illustrated in FIG. 28. The captured processed fraction has an average K&S Sphericity Value of 0.88 and an average K&S Roundness Value of 0.86. In addition, the captured processed fraction has a roundness profile of 30% of the particles≤0.8, 5% of the particles≤0.7, and 0% of the particles≤0.6. In addition, the captured processed fraction has a sphericity and roundness profile of 50% of the particles having a sphericity and roundness≥0.9 and 95% of the particles having a sphericity and roundness≥0.8.

EXAMPLE 7

Figure 29:
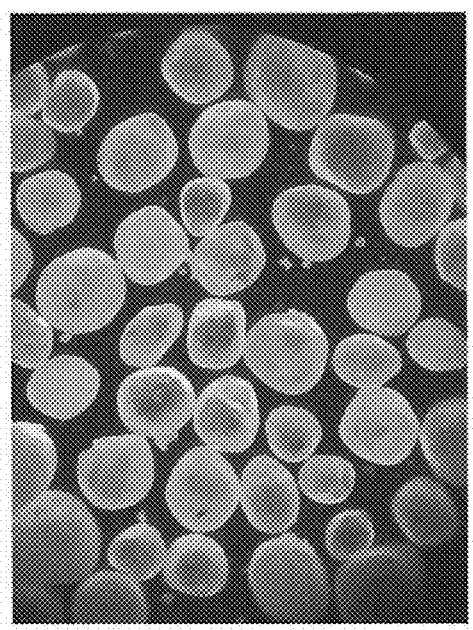
FIG. 29 is a photomicrograph of a captured processed fraction of super spherical particles following processing of the feed stock of FIG. 27, the photomicrograph being 37.5× magnification.

The second feed stock illustrated in FIG. 27 was processed by assembly 100, and more specifically separator 120. The feed stock was processed on a separator 120 having a five and a half (5.5) inch flight radius. The resulting processed feed stock fraction which exited the flights radially past the distal end 123 during processing through separator 120 was captured. The captured processed fraction is super spherical and is illustrated in FIG. 29. The captured processed fraction has an average K&S Sphericity Value of 0.88 and an average K&S Roundness Value of 0.88. In addition, the captured processed fraction has a roundness profile of 20% of the particles≤0.8, 0% of the particles≤0.7, and 0% of the particles≤0.6. In addition, the captured processed fraction has a sphericity and roundness profile of 65% of the particles having a sphericity and roundness≥0.9 and 95% of the particles having a sphericity and roundness≥0.8.

As an additional set of examples, a third sample feed stock of sand having a 20/40 grade or size fraction was also provided as a feed stock to separator 120. The feed stock has a particle size, as measured by a 20 pan having an 850 micron sieve opening size, and a 30 pan having a 600 micron sieve opening size. The particle size distribution, as a percent of total weight retained in each pan, was 1.3% for the 20 pan, 43.1% for the 30 pan, and 55.6% for the >30 pan. Similarly, the feed stock was measured by size using a U.S. Mesh Size of 20 to 30 (having a particle size interval of between 850 to 600 microns), and 30 to 40 (having a particle size interval of between 600 to 425 microns). The particle size distribution, as a percent of mass, was 43.1% for the 20 to 30 mesh size, and 55.6% for the 30 to 40 mesh size. The mean particle diameter for the feed stock was 605 microns, and the median particle diameter was 580 microns. The feed stock was then processed by separator 120 based upon particle size.

EXAMPLE 8

The third feed stock was processed by assembly 100, and more specifically separator 120 by particle size. The feed stock was processed on a separator 120 having a five inch flight radius. The resulting processed feed stock fraction which exited the flights radially past the distal end 123 during processing through separator 120 was captured. The captured processed fraction has a particle size distribution, as a percent of total weight retained in each pan, of 4.8% for the 20 pan, 84.1% for the 30 pan, and 11.1% for the >30 pan. Similarly, the captured processed fraction was measured by size using a U.S. Mesh Size. The particle size distribution, as a percent of mass, was 84.1% for the 20 to 30 mesh size, and 11.1% for the 30 to 40 mesh size. The mean particle diameter for the captured processed fraction was 700 microns, and the median particle diameter was 720 microns.

EXAMPLE 9

The third feed stock was processed by assembly 100, and more specifically separator 120 by particle size. The feed stock was processed on a separator 120 having a five inch flight radius. The resulting processed feed stock fraction which remained on the flights at the completion of the radial processing was captured. The captured processed fraction has a particle size distribution, as a percent of total weight retained in each pan, of 0.9% for the 20 pan, 46.7% for the 30 pan, and 52.4% for the >30 pan. Similarly, the captured processed fraction was measured by size using a U.S. Mesh Size. The particle size distribution, as a percent of mass, was 46.7% for the 20 to 30 mesh size, and 52.4% for the 30 to 40 mesh size. The mean particle diameter for the captured processed fraction was 613 microns, and the median particle diameter was 590 microns.

Returning to the overall invention disclosed and provided herein, the invention processes naturally occurring feed stock, for example, but not limited to, sand or silica sand or silica containing sand or quartz-based silica sand, for use as a aggregate or proppant, and further as a proppant in the hydraulic fracturing process. The resulting proppant from the invention disclosed and provided herein may have the physical properties set forth by API/ISO, including ISO 13503-2.

In addition, the resulting aggregate or proppant of a fraction preferably has an increase in roundness and/or sphericity of at least 0.01 over the feed stock, and more preferably an increase in roundness and/or sphericity of at least 0.025 over the feedstock, and more preferably an increase in roundness and/or sphericity of at least 0.05 over the feed stock, and more preferably an increase in roundness and/or sphericity of at least 0.10 over the feed stock, and more preferably an increase in roundness and/or sphericity of at least 0.15 over the feed stock.

In addition, the resulting aggregate or proppant of a fraction preferably has a decrease in roundness and/or sphericity of at least 0.01 over the feed stock, and more preferably a decrease in roundness and/or sphericity of at least 0.025 over the feedstock, and more preferably a decrease in roundness and/or sphericity of at least 0.05 over the feed stock, and more preferably a decrease in roundness and/or sphericity of at least 0.10 over the feed stock, and more preferably a decrease in roundness and/or sphericity of at least 0.15 over the feed stock.

Further, the resulting aggregate or proppant preferably has an average Krumbein and Sloss Sphericity Value of 0.6 to 1.0, more specifically an average Krumbein and Sloss Sphericity Value of 0.7 to 1.0, more specifically an average Krumbein and Sloss Sphericity Value of more than or equal to 0.8, and more specifically an average Krumbein and Sloss Sphericity Value of no less than or equal to 0.85, and more specifically an average Krumbein and Sloss Sphericity Value of no less than or equal to 0.9.

In addition, the resulting aggregate or proppant preferably has an average Krumbein and Sloss Roundness Value of 0.6 to 1.0, more specifically an average Krumbein and Sloss Roundness Value of 0.7 to 1.0, more specifically an average Krumbein and Sloss Roundness Value of more than or equal to 0.8, and more specifically an average Krumbein and Sloss Roundness Value of no less than or equal to 0.85, and more specifically an average Krumbein and Sloss Roundness Value of no less than or equal to 0.9.

In addition, the resulting aggregate or proppant of a fraction may have preferably an average Krumbein and Sloss Roundness Value of less than or equal to 0.8, more specifically an average Krumbein and Sloss Roundness Value of less than or equal to 0.7, more specifically an average Krumbein and Sloss Roundness Value of less than or equal to 0.65, and more specifically an average Krumbein and Sloss Roundness Value of less than or equal to 0.6, and more specifically an average Krumbein and Sloss Roundness Value of 0.5 to 0.6.

In addition, the resulting aggregate or proppant of a fraction may have preferably an average Krumbein and Sloss Sphericity Value of less than or equal to 0.8, more specifically an average Krumbein and Sloss Sphericity Value of less than or equal to 0.7, more specifically an average Krumbein and Sloss Sphericity Value of less than or equal to 0.65, and more specifically an average Krumbein and Sloss Sphericity Value of less than or equal to 0.6, and more specifically an average Krumbein and Sloss Sphericity Value of 0.5 to 0.6.

In addition, the resulting aggregate or proppant preferably may have a turbidity of less than 250 NTU, a specific gravity of approximately 2 to 3, more preferably below 2.8, and more preferably below 2.70, a crush resistance range of 1 to 25 K-value, and/or a solubility in 12/3 HCL/HF for 0.5 hours at 150 degrees Fahrenheit of less than or equal to two percent weight loss.

Further, the resulting aggregate or proppant having an increase or decrease in average roundness and average sphericity over the feed stock preferably has a yield of 0.1% to 99.9% by weight of the feed stock, and more preferably has a yield of 1% to 99.5% by weight of the feed stock, and more preferably has a yield of 5% to 99% by weight of the feed stock, and more preferably has a yield of 10% to 99% by weight of the feed stock, and more preferably has a yield of 15% and 99% by weight of the feed stock, and more preferably has a yield of 20% and 99% by weight of the feed stock.

Further, the resulting aggregate or proppant having an increase or decrease in average roundness and average sphericity over the feed stock preferably has a yield of 0.1% to 1% by weight of the feed stock, and more preferably has a yield of 0.1% to 5% by weight of the feed stock, and more preferably has a yield of 0.1% to 10% by weight of the feed stock, and more preferably has a yield of 0.1% to 15% by weight of the feed stock, and more preferably has a yield of 0.1% and 20% by weight of the feed stock, and more preferably has a yield of 0.1% and 50% by weight of the feed stock.

Further, the resulting aggregate or proppant may have an increase in average median particle diameter of 1 micron or more over the average median particle diameter of the feed stock, more preferably have an increase in average median particle diameter of 5 microns or more over the average median particle diameter of the feed stock, more preferably have an increase in average median particle diameter of 10 microns or more over the average median particle diameter of the feed stock, more preferably have an increase in average median particle diameter of 20 microns or more over the average median particle diameter of the feed stock, more preferably have an increase in average median particle diameter of 50 microns or more over the average median particle diameter of the feed stock, and more preferably have an increase in average median particle diameter of 100 microns or more over the average median particle diameter of the feed stock.

Further, the resulting aggregate or proppant may have a decrease in average median particle diameter of 1 micron or more over the average median particle diameter of the feed stock, more preferably have a decrease in average median particle diameter of 5 microns or more over the average median particle diameter of the feed stock, more preferably have a decrease in average median particle diameter of 10 microns or more over the average median particle diameter of the feed stock, more preferably have a decrease in average median particle diameter of 20 microns or more over the average median particle diameter of the feed stock, more preferably have a decrease in average median particle diameter of 50 microns or more over the average median particle diameter of the feed stock, and more preferably have a decrease in average median particle diameter of 100 microns or more over the average median particle diameter of the feed stock.

In addition, the system 100, 300 and/or separator assembly 120 may be operated based upon one or more operating variables. For example, an operating variable may include the type of particle fractions to be collected and/or generated (i.e. large/small, round/unround, spherical/non-spherical, etc.). As another example, an operating variable may include the yield of fractions following processing as a percent of processed fraction weight compared to total weight of feed stock (% wt/wt). The yield of fractions may be between 0.01% to 99.9% by weight of processed feed stock over weight of the feed stock, and more preferably a yield of fractions of between 1.0% to 95% by weight of processed feed stock over weight of the feed stock. As another example, an operating variable may include the number of stages provided in the processing system. As another example, an operating variable may include the number of separator assemblies 120 provided in the system 100. As another example, an operating variable may include the type of separator assemblies 120 provided in the system 100. As another example, an operating variable may include the number and/or type of processed and/or unprocessed fractions to be combined for the targeted aggregate or proppant. As another example, an operating variable may include the input rate of feed stock, for example the rate of feed stock per separator assembly 120, or the rate of feed stock per system 100, 300. As another example, an operating variable may include the footprint of the system 100, 300 and/or separator assembly 120. Operation may be based or optimized based upon these and other variables.

It should be appreciated that the resulting aggregate or proppant from one or more examples of embodiments of separator assembly 120, and/or processing assembly 100, 300 may be further processed to separate desired particles provided therein. For example, one or more fractions of processed aggregate or proppant may be further processed in an alternative processing assembly 100, 300 and/or separator(s) 120 adapted to further process particles based upon one or more properties, including, but not limited to, particle shape, particle size, particle surface texture, particle specific gravity, particle rollability, and/or particle interaction with the separator 120 or assembly 100, 300 material. For example, the resulting aggregate or proppant may remove a percentage of particles having an average Krumbein and Sloss Roundness Value equal to or below 0.90, and more specifically an average Krumbein and Sloss Roundness Value equal to or below 0.85, and more specifically an average Krumbein and Sloss Roundness Value equal to or below 0.80, and more specifically an average Krumbein and Sloss Roundness Value equal to or below 0.75, and more specifically an average Krumbein and Sloss Roundness Value equal to or below 0.70, and more specifically an average Krumbein and Sloss Roundness Value equal to or below 0.65, and more specifically an average Krumbein and Sloss Roundness Value equal to or below 0.60, and more specifically an average Krumbein and Sloss Roundness Value equal to or below 0.55, and more specifically an average Krumbein and Sloss Roundness Value equal to or below 0.50. As an additional example, the resulting aggregate or proppant may remove a percentage of particles having an average Krumbein and Sloss Sphericity Value equal to or below 0.90, and more specifically an average Krumbein and Sloss Sphericity Value equal to or below 0.85, and more specifically an average Krumbein and Sloss Sphericity Value equal to or below 0.80, and more specifically an average Krumbein and Sloss Sphericity Value equal to or below 0.75, and more specifically an average Krumbein and Sloss Sphericity Value equal to or below 0.70, and more specifically an average Krumbein and Sloss Sphericity Value equal to or below 0.65, and more specifically an average Krumbein and Sloss Sphericity Value equal to or below 0.60, and more specifically an average Krumbein and Sloss Sphericity Value equal to or below 0.55, and more specifically an average Krumbein and Sloss Sphericity Value equal to or below 0.50.

For example, angular, irregular or abrasive material, such as particles having an average Krumbein and Sloss Sphericity Value of less than or equal to 0.8, and more specifically less than or equal to 0.70, and more specifically less than or equal to 0.60, and more specifically less than or equal to 0.50, and more specifically less than or equal to 0.40, and more specifically less than or equal to 0.30, and/or an average Krumbein and Sloss Roundness Value of less than or equal to 0.8, and more specifically less than or equal to 0.7, and more specifically less than or equal to 0.6, and more specifically less than or equal to 0.5, and more specifically less than or equal to 0.4, and more specifically less than or equal to 0.3 may be desired. A separator assembly 120 may be configured such that the more round and/or more spherical particles are radially ejected or accepted from the separator assembly 120 as a first fraction, leaving the desired angular, irregular or abrasive particles or material as a desired second fraction. The angular particles or material may be later mixed with substantially round and/or spherical particles (i.e. particles having an average Krumbein and Sloss Sphericity Value of 0.6 or greater, and more specifically of 0.7 or greater, and more specifically of 0.8 or greater, and more specifically of 0.9 or greater, and/or particles having an average Krumbein and Sloss Roundness Value of 0.6 or greater, and more specifically of 0.7 or greater, and more specifically of 0.8 or greater, and more specifically of 0.9 or greater. The resulting recombinant aggregate or proppant or prop-pack (group of two or more grains or particles of a aggregate or proppant that together can form a matrix) of substantially round and/or spherical particles and substantially angular particles may have certain advantages as an aggregate or proppant used during hydraulic fracturing or sand control, including, but not limited to, the reduction of flow-back in a gravel pack or hydraulic fracture or fissure, maintaining the fissure in a wider open state, promoting an increase in permeability or conductivity, and/or increasing well productivity. A nonlimiting example of one or more recombinant particles is provided below.

The following Examples provide an illustration of one or more examples of embodiments of a recombinant particle mixture. More specifically, the following Examples provide an illustration of one or more fractions of a feed stock processed by processing assembly 100, 300 and/or separator 120 and subsequently recombined in a targeted or desired manner to produce a recombinant particle mixture. The following Examples are provided for illustration and are not intended to limit the scope of the invention. The feedstock used to produce each fraction combined to form a recombinant sand can be the same or different. For example, all of the fractions combined may be the same size, such as a 20/40 size. As another example, the fractions combined may be differently sized, such as a first processed fraction derived from a 20/40 size and a second processed fraction derived from a 30/50 size.

EXAMPLE 10

A sample feed stock was processed through system 100, 300, and more specifically separator 120. Two fractions were produced and collected through processing. A first fraction or spherical and rounded fraction was collected. The spherical and rounded fraction was collected from processed feed stock fraction which exited the flights of separator 120 radially past the distal end 123 during processing. A second fraction or abrasive fraction was also collected. The abrasive fraction was collected from processed feed stock fraction which remained on the flights at the completion of the radial processing through separator 120. The spherical and rounded fraction had an average K&S Sphericity Value of 0.88 and an average K&S Roundness Value of 0.86. In addition, the spherical and rounded fraction had 95% of particles having a sphericity and roundness≥0.8. Further, the spherical and rounded fraction had 0% of particles having a roundness≤0.7, and 0% of particles had a sphericity and roundness≤0.6. The abrasive fraction had an average K&S Sphericity Value of 0.76 and an average K&S Roundness Value of 0.76. In addition, the abrasive fraction had 50% of particles having a sphericity and roundness≥0.8. Further, the abrasive fraction had 35% of particles having a roundness≤0.7, and 10% of particles had a roundness≤0.6.

The spherical and rounded fraction and abrasive fraction were mixed together to form a recombinant aggregate or proppant. The recombinant aggregate or proppant was mixed at various ratios by weight of spherical and rounded fraction to abrasive fraction. Each of the recombinant mixtures had certain different properties. For example, a first recombinant aggregate or proppant was made from 90% spherical and rounded fraction and 10% abrasive fraction, or a 90:10 ratio. The first recombinant aggregate had an average K&S Sphericity Value of 0.82 and an average K&S Roundness Value of 0.83. In addition, the first recombinant aggregate had 70% of particles having a sphericity and roundness≥0.8. Further, the first recombinant aggregate had 10% of particles having a roundness≤0.7, and 5% of particles had a roundness≤0.6.

As another example, a second recombinant aggregate or proppant was made from 80% spherical and rounded fraction and 20% abrasive fraction, or a 80:20 ratio. The second recombinant aggregate had an average K&S Sphericity Value of 0.77 and an average K&S Roundness Value of 0.82.

In addition, the second recombinant aggregate had 70% of particles having a sphericity and roundness≥0.8. Further, the second recombinant aggregate had 10% of particles having a roundness≤0.7, and 5% of particles had a roundness≤0.6.

As another example, a third recombinant aggregate or proppant was made from 70% spherical and rounded fraction and 30% abrasive fraction, or a 70:30 ratio. The third recombinant aggregate had an average K&S Sphericity Value of 0.77 and an average K&S Roundness Value of 0.79. In addition, the third recombinant aggregate had 50% of particles having a sphericity and roundness≥0.8. Further, the third recombinant aggregate had 25% of particles having a roundness≤0.7, and 10% of particles had a roundness≤0.6.

EXAMPLE 11

A sample feed stock was screened to a 20/40 grade or size fraction. The feed stock has a particle size, as measured by a 20 pan having an 850 micron sieve opening size, and a 30 pan having a 600 micron sieve opening size. The particle size distribution, as a percent of total weight retained in each pan, was 0.7% for the 20 pan, 30.2% for the 30 pan, and 69.1% for the >30 pan. Similarly, the feed stock was measured by size using a U.S. Mesh Size of 20 to 30 (having a particle size interval of between 850 to 600 microns), and 30 to 40 (having a particle size interval of between 600 to 425 microns). The particle size distribution, as a percent of mass, was 30.2% for the 20 to 30 mesh size, and 69.1% for the 30 to 40 mesh size. The mean particle diameter for the feed stock was 577 microns, and the median particle diameter (MPD) was 555 microns. The feed stock was then processed through system 100, 300, and more specifically separator 120. The spirals of separator 120 had a five inch radius. Splitter assembly 430 was provided along flights 122. The splitter assembly 430 was provided one inch radially away from central member 124. Two fractions were produced and collected through processing. A first fraction or spherical and rounded fraction was collected. The spherical and rounded fraction was collected from processed feed stock fraction which exited the flights of separator 120 radially past the distal end 123 during processing. A second fraction or angular fraction was also collected. The angular fraction was the resulting processed feed stock fraction between proximal end 121 or central member 124 and splitter assembly 430, and was acquired within the one inch radial distance.

The spherical and rounded fraction had a particle size distribution, as a percent of total weight retained in each pan, of 3.5% for the 20 pan, 64.9% for the 30 pan, and 31.6% for the >30 pan. Similarly, the spherical and rounded fraction was measured by size using a U.S. Mesh Size of 20 to 30 (having a particle size interval of between 850 to 600 microns), and 30 to 40 (having a particle size interval of between 600 to 425 microns). The particle size distribution, as a percent of mass, was 64.9% for the 20 to 30 mesh size, and 31.6% for the 30 to 40 mesh size. The mean particle diameter for the spherical and rounded fraction was 655 microns, and the median particle diameter (MPD) was 675 microns.

The angular fraction had a particle size distribution, as a percent of total weight retained in each pan, of 2.7% for the 20 pan, 18.9% for the 30 pan, and 78.4% for the >30 pan. Similarly, the angular fraction was measured by size using a U.S. Mesh Size of 20 to 30 (having a particle size interval of between 850 to 600 microns), and 30 to 40 (having a particle size interval of between 600 to 425 microns). The particle size distribution, as a percent of mass, was 18.9% for the 20 to 30 mesh size, and 78.4% for the 30 to 40 mesh size. The mean particle diameter for the angular fraction was 554 microns, and the median particle diameter (MPD) was 535 microns.

The spherical and rounded fraction and the angular fraction were subsequently mixed together in a ratio of 80:20, or 80% spherical and rounded fraction and 20% angular fraction as a percent by weight. The combined recombinant fraction had a particle size distribution, as a percent of total weight retained in each pan, of 1.5% for the 20 pan, 54.5% for the 30 pan, and 43.9% for the >30 pan. Similarly, the combined recombinant fraction was measured by size using a U.S. Mesh Size of 20 to 30 (having a particle size interval of between 850 to 600 microns), and 30 to 40 (having a particle size interval of between 600 to 425 microns). The particle size distribution, as a percent of mass, was 54.5% for the 20 to 30 mesh size, and 43.9% for the 30 to 40 mesh size. The mean particle diameter for the combined recombinant fraction was 630 microns, and the median particle diameter (MPD) was 630 microns.

EXAMPLE 12

A sample feed stock was screened to a 30/50 grade or size fraction. The feed stock has a particle size, as measured by a 30 pan having a 600 micron sieve opening size, and a 40 pan having a 425 micron sieve opening size. The particle size distribution, as a percent of total weight retained in each pan, was 3.7% for the 30 pan, 44.1% for the 40 pan, and 52.2% for the >40 pan. Similarly, the feed stock was measured by size using a U.S. Mesh Size of 30 to 40 (having a particle size interval of between 600 to 425 microns), and 40 to 50 (having a particle size interval of between 425 to 300 microns). The particle size distribution, as a percent of mass, was 44.1% for the 30 to 40 mesh size, and 52.2% for the 40 to 50 mesh size. The mean particle diameter for the feed stock was 431 microns, and the median particle diameter (MPD) was 420 microns. The feed stock was then processed through system 100, 300, and more specifically separator 120. The spirals of separator 120 had a five inch radius. Two fractions were produced and collected through processing. The first fraction or spherical and rounded fraction, was collected.

The spherical and rounded fraction of the 30/50 was collected from processed feed stock fraction which exited the flights of separator 120 radially past the distal end 123 during processing. The spherical and rounded fraction of the 30/50 had a particle size distribution, as a percent of total weight retained in each pan, of 11.1% for the 30 pan, 33.3% for the 40 pan, and 55.6% for the >40 pan. Similarly, the spherical and rounded fraction of the 30/50 was measured by size using a U.S. Mesh Size of 30 to 40 (having a particle size interval of between 600 to 425 microns), and 40 to 50 (having a particle size interval of between 425 to 300 microns). The particle size distribution, as a percent of mass, was 33.3% for the 30 to 40 mesh size, and 55.6% for the 40 to 50 mesh size. The mean particle diameter for the spherical and rounded fraction of the 30/50 was 419 microns, and the median particle diameter (MPD) was 415 microns.

The spherical and rounded fraction of the 20/40 grade (in Example 11) was then mixed together with the spherical and rounded fraction of the 30/50 in a ratio of 90:10, or 90% spherical and rounded fraction of the 20/40 grade and 10% spherical and rounded fraction of the 30/50 grade. The combined recombinant fraction had a particle size distribution, as a percent of total weight retained in each pan, of 3.2% for the 20 pan, 60% for the 30 pan, and 32% for the 40 pan, and 5.6% for the 50 pan. Similarly, the combined recombinant fraction was measured by size using a U.S. Mesh Size of 20 to 30 (having a particle size interval of between 850 to 600 microns), 30 to 40 (having a particle size interval of between 600 to 425 microns), and 40 to 50 (having a particle size interval of between 425 to 300 microns). The particle size distribution, as a percent of mass, was 59.5% for the 20 to 30 mesh size, 31.8% for the 30 to 40 mesh size, and 5.6% for the 40 to 50 mesh size. The mean particle diameter for the combined recombinant fraction was 635 microns, and the median particle diameter (MPD) was 650 microns.

The invention disclosed herein provides certain advantages. For example, the processing assembly, system, and associated separator processes feed stock to produce a substantially round and substantially spherical proppant suitable for hydraulic fracturing or sand control, such as for gravel packing, from common sources. This resulting proppant advantageously increases hydrocarbon productivity from a fissure or fracture network due to the high degree of proppant sphericity and roundness and/or increased or decreased mean or median particle diameter, or particle size distribution, or modified MPD (i.e. an increase in MPD or a decrease in MPD), or modified surface texture. This may reduce pressure loss in the fissure or fracture network leading to an increase in conductivity and well productivity. In addition, a tailored size distribution profile or modified mean particle diameter or MPD (such as a coarser MPD within a sand size grade to increase conductivity; or a finer MPD within a sand size grade to increase strength) can improve a performance of a proppant and can increase hydrocarbon productivity. In addition, the resulting proppant can advantageously reduce embedment of the proppant within a wall of a fissure or fracture in the fissure network. This reduction can maintain the fissure or fracture in a wider open state, also increasing conductivity and productivity of the well. Further, the resulting proppant advantageously can promote improved properties of a proppant, including increased crush resistance, strength, permeability, conductivity, and reduced tortuosity, turbulization or pressure losses and maintain a more even stress distribution throughout the prop-pack. In addition, the processing assembly, system, and associated separator provided herein has several advantages, including the ability to process a feed stock which is generally unsuitable for use as a proppant and more specifically as a proppant suitable for use in hydraulic fracturing, and produce a proppant which is suitable for use in hydraulic fracturing and/or sand control. The processing assembly, system, and associated separator may be mobile and/or operated "on the fly." These and other advantages are realized by the invention and associated disclosure provided herein.

Although various representative examples of embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A process for producing a proppant comprising:
    prescreening an approximately dry feed stock formed of feed stock particles comprising a naturally occurring sand suitable for use as a frac sand so as to capture a predetermined size grade range of feed stock particles;
    feeding said predetermined size grade range of feed stock particles into a separator assembly, the separator assembly having an entry end and a plurality of flights helically nested about a core member;
    distributing the predetermined size grade range of feed stock particles from the entry end onto at least one of the plurality of flights;
    wherein the predetermined size grade range of feed stock particles travels along any one or more of the flights from the plurality of flights, moving helically about the core member; and
    wherein feed stock particles of relatively greater roundness and/or sphericity travel towards a distal end of the any one or more of the flights from the plurality of flights, exit the any one or more of the flights radially, and are collected by a first collection portion while remaining feed stock particles of relatively lower roundness and/or sphericity remain on the any one or more of the flights in proximity to a proximal end of the any one or more of the flights and are collected by a second collection portion, such that the feed stock is separated into two fractions of feed stock particles comprising a first fraction of feed stock particles having a mean and/or median quality for use as a proppant which quality is greater than the quality of the predetermined size grade range of feed stock particles, and a second fraction of feed stock particles having a mean and/or median quality for use as a proppant which quality is less than the quality of the predetermined size grade range of feed stock particles, and wherein the mean and/or median quality of the first fraction is greater than the mean and/or median quality of the second fraction.

2. The process of claim 1, further comprising dispersing the predetermined size grade range of feed stock particles with a dispersal member at the entry end of the separator assembly in order to distribute the feed stock across the entry end.

3. The process of claim 1, further comprising directing the remaining feed stock particles to an outlet which further directs the feed stock particles to the second collection portion.

4. The process of claim 3, wherein the remaining feed stock particles are directed to the outlet using a teimination member.

5. The process of claim 1, wherein the process produces a yield of substantially round feed stock particles of at least ten percent for use as a proppant.

6. A process for producing a proppant comprising:
introducing a volume of naturally occurring approximately dry sand particles which is a proppant meeting API-ISO standards and of particular mesh size grade as a feed stock into a spiral separator, whereby the volume of naturally occurring approximately dry sand particles is separated into a first fraction of sand particles and a second fraction of sand particles, wherein the first fraction of sand particles as a whole exhibits a certain physical property which is not exhibited by the second fraction of sand particles as a whole and which is not exhibited by the feed stock.

7. The process of claim 6, wherein the volume of naturally occurring approximately dry sand particles which is a proppant meeting API-ISO standards is processed according to particle size prior to introduction into the spiral separator to achieve the particular mesh size grade.

8. The process of claim 6, wherein the volume of naturally occurring approximately dry sand particles is a predetermined size fraction of feed stock and is processed according to particle surface texture.

9. The process of claim 6, wherein the process produces a yield of the first fraction of sand particles of at least ten percent for use as a proppant.

10. The process of claim 6, further comprising prescreening an approximately dry feed stock formed of feed stock particles comprising a naturally occurring sand so as to capture the particular mesh size grade of feed stock prior to the introducing step.

11. The process of claim 10, wherein the particular mesh size grade of feed stock is 20/40 according to API-ISO standards.

12. The process of claim 6, wherein the first fraction of sand particles is of the same mesh size grade as the feed stock and has a mean and/or median quality for use as a proppant which quality is higher than that of the volume of naturally occurring approximately dry sand particles introduced into the spiral separator, and the second fraction of sand particles is of the same mesh size grade as the feed stock and has a mean and/or median quality for use as a proppant which quality is lower than that of the volume of naturally occurring approximately dry sand particles introduced into the spiral separator.

13. The process of claim 6, wherein the certain physical property is selected from the group consisting of a greater or lesser roundness, a greater or lesser sphericity, a greater or smaller mean and/or median particle diameter, a greater or smaller diameter, more or less smooth, more or less rough, increased or decreased contaminants.

14. The process of claim 6, wherein the feed stock, the first fraction, and the second fraction each meet API-ISO standards.

15. The process of claim 6, wherein the particles in the first and second fractions are not physically altered to achieve said certain physical property.

16. The process of claim 1, wherein the higher quality is selected from the group consisting of a greater roundness, a greater sphericity, a greater size, a greater mean and/or median particle diameter, more smooth, less rough, and decreased contaminants, and the lower quality is selected from the group consisting of a lower roundness, a lower sphericity, a smaller size, a smaller mean and/or median particle diameter, less smooth, more rough, and increased contaminants.

17. The process of claim 1, wherein the predetermined size fraction of feed stock has an average Krumbein and Sloss value greater than or equal to 0.6.

18. The process of claim 1, wherein the predeteimined size grade range of feed stock particles and output is 20/40 according to API-ISO standards.

19. The process of claim 1, wherein the feed stock, the first fraction, and the second fraction each meet API-ISO standards.

20. The process of claim 1, wherein the particles in the first and second fractions are not physically altered to achieve the respective mean and/or median qualities.

21. The process of claim 1, wherein the first fraction has an increase in conductivity relative to the predetermined size grade range of feed stock and the approximately dry feed stock.

* * * * *